(12) United States Patent
Grolle

(10) Patent No.: US 10,922,980 B2
(45) Date of Patent: Feb. 16, 2021

(54) PLATOONING TRAFFIC ANNUNCIATOR

(71) Applicant: BENDIX COMMERCIAL VEHICLE SYSTEMS LLC, Elyria, OH (US)

(72) Inventor: Kenneth A. Grolle, Elyria, OH (US)

(73) Assignee: BENDIX COMMERCIAL VEHICLE SYSTEMS LLC, Elyria, OH (US)

( * ) Notice: Subject to any disclaimer, the term of this patent is extended or adjusted under 35 U.S.C. 154(b) by 175 days.

(21) Appl. No.: 16/220,929

(22) Filed: Dec. 14, 2018

(65) Prior Publication Data
US 2020/0193837 A1 Jun. 18, 2020

(51) Int. Cl.
| | |
|---|---|
| G08G 1/00 | (2006.01) |
| B60Q 1/28 | (2006.01) |
| B60W 30/165 | (2020.01) |
| F21V 7/00 | (2006.01) |
| B60Q 1/26 | (2006.01) |
| G06F 17/00 | (2019.01) |
| G08G 1/09 | (2006.01) |
| G08B 5/38 | (2006.01) |
| B60Q 1/50 | (2006.01) |

(52) U.S. Cl.
CPC ............... G08G 1/22 (2013.01); B60Q 1/50 (2013.01); G08B 5/38 (2013.01)

(58) Field of Classification Search
CPC ... G08G 1/00; G08G 1/09; B60Q 1/28; B60Q 1/26; B60W 30/165; F21V 7/00; G06F 17/00

See application file for complete search history.

(56) References Cited

U.S. PATENT DOCUMENTS

| | | | |
|---|---|---|---|
| 6,733,134 B2 | 5/2004 | Bleiner | |
| 9,013,293 B2 | 4/2015 | Pimentel | |
| 9,224,300 B2 | 12/2015 | Lee | |
| 9,290,181 B1 | 3/2016 | Dolgov | |
| 9,384,666 B1 | 7/2016 | Harvey | |
| 9,463,799 B1 | 10/2016 | Bartels | |
| 10,037,689 B2 * | 7/2018 | Taylor | G08G 1/096844 |
| 10,252,721 B1 * | 4/2019 | Bai | G08G 1/22 |
| 2002/0070849 A1 | 6/2002 | Teicher | |
| 2006/0098448 A1 * | 5/2006 | Coast | B60Q 1/44 362/517 |
| 2008/0134955 A1 | 6/2008 | Morrow | |

(Continued)

*Primary Examiner* — Yuri Kan
(74) *Attorney, Agent, or Firm* — Tucker Ellis LLP

(57) ABSTRACT

An annunciator system annunciates a mode of a platoon operation being performed between first and second platooning vehicles travelling cooperatively in accordance with a selected mode of the platoon operation. First and second visual indicators generate first and second visual signals having different colors based on visual indicator command signals generated by an annunciator control unit that operates to generate the first and second visual indicator command signals based on a determined mode of the platoon operation being performed between the associated first and second platooning vehicles. The visual annunciator system may be installed on the rear of platooning capable commercial vehicles in an unambiguous location so that it is not confused with other vehicle lamps, and is of a low intensity that does not shine directly at following traffic. The annunciator system generates two different visual colors that may be illuminated and/or flashed to encode the platoon operating mode.

20 Claims, 12 Drawing Sheets

(56) References Cited

U.S. PATENT DOCUMENTS

| | | | |
|---|---|---|---|
| 2013/0124007 A1* | 5/2013 | Karl | G01G 19/086 |
| | | | 701/1 |
| 2015/0336502 A1* | 11/2015 | Hillis | G06F 3/017 |
| | | | 701/23 |
| 2016/0019782 A1 | 1/2016 | Alam | |
| 2016/0163200 A1* | 6/2016 | He | G08G 1/22 |
| | | | 701/117 |
| 2017/0361762 A1* | 12/2017 | Wunsche, III | B60T 7/22 |
| 2019/0355259 A1* | 11/2019 | Kruppa | G05D 1/0234 |

\* cited by examiner

| COLOR #1 | COLOR #2 | VIABLE? | MODE |
|---|---|---|---|
| OFF | OFF | NO | X |
| OFF | ON | NO | X |
| OFF | FLASH | NO | X |
| ON | OFF | NO | X |
| ON | ON | YES | MODE 1 |
| ON | FLASH | YES | MODE 2 |
| FLASH | OFF | NO | X |
| FLASH | ON | YES | MODE 3 |
| FLASH | FLASH | YES | MODE 4 |

FIGURE 6

PLATOONING TRAFFIC ANNUNCIATOR

TECHNICAL FIELD

The embodiments herein relate generally to highway vehicle platoon management. More specifically, particular embodiments relate to commercial highway vehicle platoon management wherein the platooning vehicles may broadcast one or more signals representative of their platooning state or mode of platooning operation to non-platooning traffic vehicles travelling near to the platooning vehicles which could be observed or otherwise detectable by nearby non-platooning vehicles for use in modifying their behavior relative to the platooning vehicles as may be necessary or desired to accommodate the platoon. Although the embodiments will be described with reference to selected particular examples such as for example vehicles traveling seriatim in the platoon, it is to be appreciated that the claimed invention is also amenable to other applications and can be equivalently extended to other embodiments, environments, and platoon formations.

BACKGROUND

It is known that two or more vehicles moving along a roadway can cooperate as a road train or a "platoon" for mutually providing to the vehicles within the platoon various safety and efficiency benefits. A typical vehicle platoon includes a leader vehicle and one or more follower vehicles arranged serially along a single roadway lane. Larger platoons can involve many follower vehicles and may span multiple highway lanes for providing enhanced efficiency, but ensuring the safety of both the platooned vehicles as well as of the other non-platooning vehicles and constraints owing to standardized roadways most usually dictate the short single lane platoon incarnation.

The aerodynamic geometry of the vehicles within a platoon is a significant factor used in determining an ordering of the vehicles. As a general rule, a physically smaller vehicle following a physically larger vehicle will provide a greater benefit. Since commercial box trucks and tractors towing box trailers are in general taller and wider than most flatbed tractor trailer combinations, a maximum aerodynamic benefit and resultant fuel savings is realized by ordering vehicles classified this way such that the commercial box truck and tractors towing box trailers take the leader position(s) in the platoon, while the flatbed tractor trailer rigs take the follower position(s) in the platoon.

In addition to the above, maintaining a small distance or spacing between platooned vehicles gives greater benefit in terms of reduced energy consumption. However, holding a tight distance or spacing between platooned vehicles requires that careful attention be paid to various functional or environmental and operational characteristics and capabilities of the vehicles and other external conditions including the overall size of the platoon, weather conditions, relative braking abilities between vehicle pairs, relative acceleration abilities, relative load or cargo size and weight including required stopping distance, and the like. Special attention must also be paid to characteristics of the roadway such as roadway incline, decline, and turn radii. These various parameters implicate directly or indirectly the inter-vehicle safety considerations as well as the overall safety of multiple vehicle platoons.

In the single lane platoon incarnation described above, the vehicles participating in a platoon typically mutually cooperate to maintain a relatively fixed and constant (even or the same) distance between adjacent vehicles by exchanging deceleration command and other signals between adjacent vehicles of the platoon. On flat roadways, the even distance maintained between the vehicles is often fixed and constant in accordance with control protocols using combinations of global positioning systems (GPS) data sharing, deceleration command signal exchanges, and safety and efficiency algorithms. On graded roadways, the relatively even distance maintained between the vehicles is often modified to improve or otherwise maintain or enhance the overall safety and efficiency of the platoon. For example, the even distance maintained between the vehicles can be decreased during conditions of the platoon traversing an incline wherein the tendency of the overall platoon is to decrease speed slightly. Conversely, the even distance maintained between the vehicle can be increased during conditions of the platoon traversing a decline wherein the tendency of the overall platoon is to increase speed slightly. In any case, the relative distance between the vehicles of the platoon preferably remains substantially even, constant or the same in accordance with platoon control mechanisms and protocols in place.

For maintaining the preferred relatively fixed and constant (even or the same) distance between adjacent vehicles, many commercial vehicles that participate in platoons are highly sophisticated and are also equipped with adaptive cruise control (ACC) systems including forward and rearward sensors used for maintaining a safe relative distance between a vehicle hosting the ACC system and a forward vehicle, and collision mitigation (CM) systems for avoiding or lessening the severity of impacts between a vehicle hosting the CM system and vehicles forward of the host vehicle using various combinations of transmission control, vehicle retarder, and foundation brake controls.

Vehicles participating in a platoon typically share a status of their platoon participation with other vehicles on the roadway by communicating platooning operation data with the other vehicles using vehicle-to-vehicle (V2V) communications ("V2V Unicast" communications), and/or vehicle-2-vehicles (V2x) communications ("V2V Multicast" communications), and/or any other suitable communications that might be available. The shared platooning operation data might include information related to a fleet identification for example so that other vehicles may know whether platoon participation might be possible based on platoon cooperation agreements between different fleets or the like, for example.

In addition to the above, vehicles participating in a platoon typically share their positions with other vehicles of the platoon by communicating their GPS coordinate data with other vehicles using the V2V communications, the V2V Unicast communications, the V2x communications, the V2V Multicast communications, and/or any other suitable communications that might be available. One SAE standard is J2945 directed in general to Dedicated Short Range Communication (DSRC), and a work in process portion of that standard is J2945/6 is directed to performance requirements for cooperative adaptive cruise control and platooning. J2945/6 is intended to define the data exchange that will be necessary for coordinated platoon maneuvers, and that definition of the categories should start with differentiating between platooning and ACC, then determining message sets and performance to realize cooperative vehicles.

Currently, the technique for vehicles participating in a platoon to share their position with other vehicles of the platoon involves determining, by each vehicle, its own GPS coordinate data, broadcasting by each vehicle its own GPS coordinate data to all of the other vehicles of the platoon using over-the-air communications (such as the J2945/6 communications), and receiving the GPS position data from all of the other vehicles of the platoon. In this way, each vehicle of the platoon knows the position(s) of each other vehicle of the platoon. The GPS coordinate data is then used by each vehicle to, among other things, establish the relatively even distance coordinated between the vehicles as generally described above.

Platoons that operate on public roadways, however, must contend with additional factors such as other non-platooning vehicles travelling on the roadway together with the platooning vehicles. These other non-platooning vehicles may not be equipped to communicate in any appreciable way with the vehicles of the platoon using the communication protocols and techniques described above. These other non-platooning and non-communicative other vehicles might be inadvertently operated in a manner as to obstruct or otherwise interfere with the operation of the platoon. For example, an unaware driver of a non-platooning vehicle may want to travel between platooning vehicles for various reasons. However, if the operator of the intervening vehicle had some knowledge that the vehicles traveling together were actively platooning with each other, the driver might decide to defer the intervening maneuver.

In addition to the above, law enforcement officials driving non-platooning and non-communicative government vehicles may want to know if certain vehicles under observation are actively platooning, rather than simply tailgating for example, when those vehicles are noticed traveling tightly together or when noticed exhibiting other potentially unusual behaviour.

Drivers of non-platooning vehicles may be interested in knowing whether other vehicles on the roadway are actively platooning so that decisions can be made on whether to request for participation in the platoon.

The drivers of non-platooning vehicles may also be interested in knowing a mode of platooning operation being performed by the actively platooning vehicles on the roadway so that decisions can be made by the non-platooning driver on whether to merge into the platoon arrangement and also so that decisions can be made on where to merge relative to the platoon formation or structure.

The present embodiments provide for a new and improved visual annunciator and method for visually annunciation for broadcasting a mode of a platooning operation of vehicles.

The systems and methods of the embodiments detect a platooning operation and broadcast the detected mode to other traffic on the roadway using visual signals.

SUMMARY OF THE EXAMPLE EMBODIMENTS

The embodiments permit a vehicle moving along a roadway and cooperating as a platoon or a "road train" to annunciate it's platoon participation to other non-platooning and/or non-communicative vehicles on the roadway.

In accordance with an embodiment, an annunciator system is provided for annunciating a mode of a platoon operation being executed or otherwise performed between associated first and second platooning vehicles travelling cooperatively in accordance with a selected mode of the platoon operation. The annunciator system includes an annunciator control unit configured to be disposed in the associated first vehicle, a housing, and first and second visual indicators coupled with the housing. A processor of the annunciator control unit executes logic stored in a non-transient memory device to generate command signals. In the embodiment, the first visual indicator selectively generates a first visual signal having a first color based on a first visual indicator command signal, and the second visual indicator selectively generates a second visual signal having a second color different than the first color based on a second visual indicator command signal. The annunciator control unit operates to generate the first and second visual indicator command signals based on the determined mode of the platoon operation being executed or otherwise performed between the associated first and second platooning vehicles.

Further in accordance with an example embodiment, a method is provided for annunciating an operational mode of a platoon operation being performed between associated first and second platooning vehicles travelling cooperatively as a platoon in accordance with a selected mode of the platoon operation. The method includes executing logic stored in a non-transient memory of an associated annunciator device to determine a mode of the platoon operation being performed between the associated first and second platooning vehicles. The logic is executed to generate first and second visual indicator command signals based on the determined mode of the platoon operation. Based on the determined mode of the platoon operation, a first visual indicator of the associated annunciator device selectively generates a first visual signal having a first color based on the first visual indicator command signal generated by the logic. Also based on the determined mode of the platoon operation, a second visual indicator of the associated annunciator device electively generates a second visual signal having a second color different than the first color based on the second visual indicator command signal generated by the logic.

The method may include in an embodiment generating the first and second visual indicator command signals simultaneously for a first predetermined time period and, based on the determined mode of the platoon operation, generating only a single one of the first and second visual indicator command signals or neither of the first and second visual indicator command signals for a second predetermined time period after the first predetermined time period.

Other embodiments, features and advantages of the example embodiments for platooning operation annunciation for non-platooning traffic vehicles will become apparent from the following description of the embodiments, taken together with the accompanying drawings, which illustrate, by way of example, the principles of the example embodiments.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

FIG. 6 is a Table showing a platooning operation annunciation scheme according to the example embodiment.

DETAILED DESCRIPTION OF THE EXAMPLE EMBODIMENTS

In the following description of the present invention reference is made to the accompanying figures which form a part thereof, and in which is shown, by way of illustration, exemplary embodiments illustrating the principles of the present invention and how it is practiced. Other embodiments can be utilized to practice the present invention and structural and functional changes can be made thereto without departing from the scope of the present invention.

Figure 1:
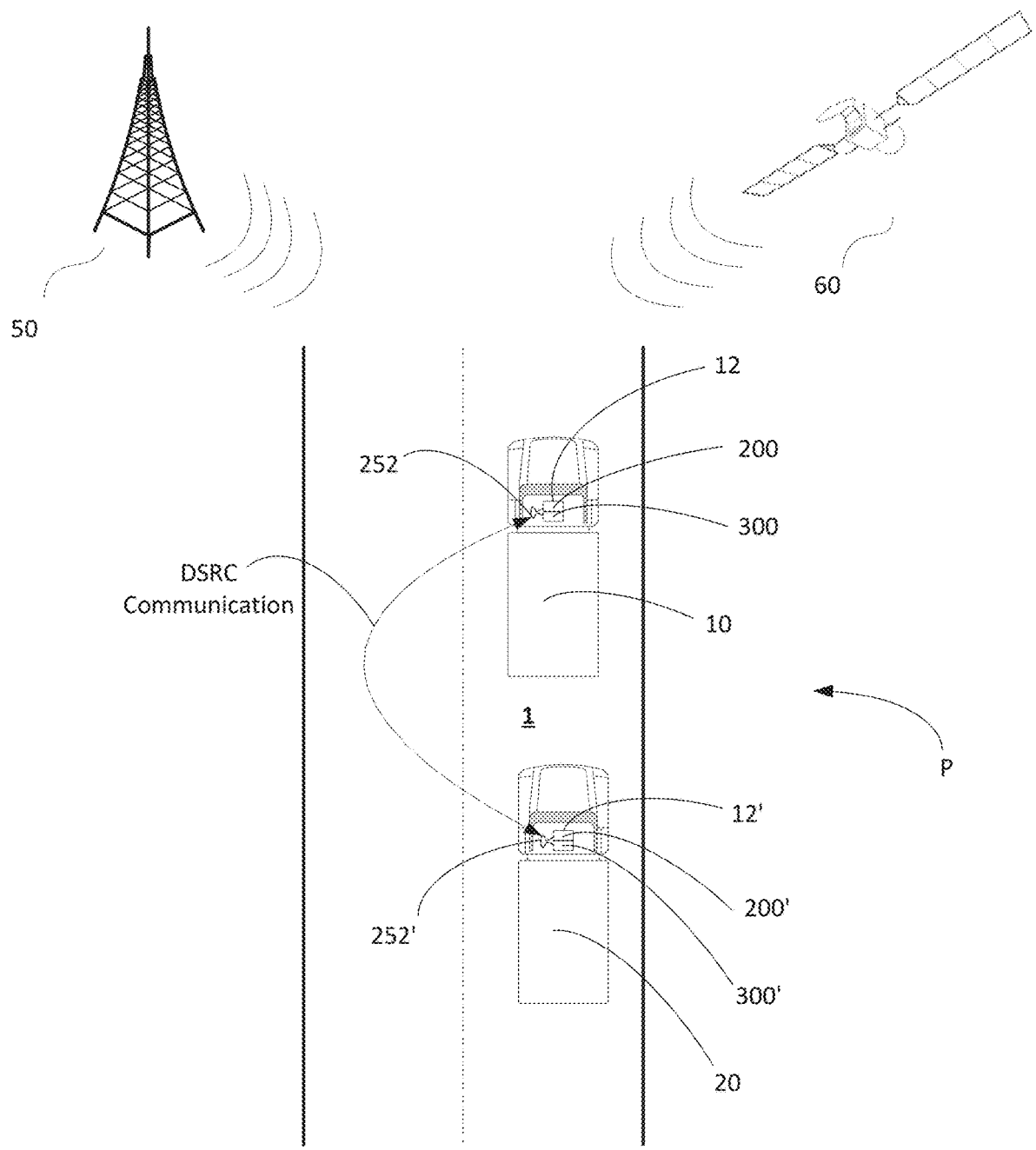
FIG. 1 depicts operation of an exemplary platoon in accordance with the embodiments.

Referring now to the drawings, wherein the showings are for the purpose of illustrating the example embodiments for platooning operation annunciation for non-platooning traffic vehicles only, and not for purposes of limiting the same, FIG. 1 illustrates a basic platoon P having two (2) vehicles including a host or leader vehicle 10 in traffic with a second or follower vehicle 20 in accordance with the present disclosure. As shown, the follower vehicle 20 is traveling proximate to the leader vehicle 10 in an ordered platoon P along a roadway 1. In the example embodiment shown, the follower vehicle 20 is traveling proximate to the leader vehicle 10 seriatim along the roadway 1 in the example platoon P. However, it is to be appreciated that the platoon P can take on any arrangement of vehicle conformation in accordance with further embodiments. The leader vehicle 10 is provided with an electronic control system 12 which includes a data collection and communication module portion 200 (FIG. 2) and a platooning control portion 300 (FIG. 3) to be described in greater detail below. Similarly, the follower vehicle 20 is also provided with an electronic control system 12' which includes a data collection and communication module portion 200' equivalent or otherwise similar to the data collection and communication module portion 200 of the leader vehicle 10, and a platooning control portion 300' equivalent or otherwise similar to the platooning control portion 300 of the leader vehicle 10. In the example embodiments to be described herein, each of the two or more vehicles comprising the various platoon operations that will be described include the same or equivalent electronic control system 12, the same or equivalent data collection and communication module portion 200, and the same or equivalent platooning control portion 300. However, it is to be appreciated that other control systems having functionality equivalent to the functionality to be described herein may equivalently be used as necessary or desired.

In the example embodiment illustrated, the electronic control systems 12, 12' of the respective vehicles 10, 20 are configured for mutually communicating signals and exchanging data between each other, and also for communicating signals and exchanging data with various other communication systems including for example a remote wireless communication system 50 and a remote satellite system 60. These remote systems 50, 60 can provide, for example, global position system (GPS) data to the vehicles 10, 20 as desired. Other information may be provided or exchanged between the vehicles and the remote systems as well such as, for example, fleet management and control data from a remote fleet management facility, or the like (not shown). Although this functionality is provided, the embodiments herein find this remote communication, though useful, not necessarily essential wherein the embodiments herein are directed to annunciation of platooning operation directly to non-platooning traffic vehicles beneficially and without the need to consult with or act under the direction of or in concert with the remote wireless communication system 50, the remote satellite system 60, the remote fleet management facility, a Network Operations Center (NOC), a Central Command Center (CCC), or the like. It is to be appreciated that in an example embodiment, however, the remote wireless communication system 50 and/or the remote satellite system 60 may be implemented to download or to otherwise communicate certain operational commands to the platooning vehicles which operational commands may in turn be communicated to the other non-platooning vehicles on the roadway using one or more of the annunciator system, device, and signaling protocols or others, as may be deemed necessary or desired. For example, the remote wireless communication system 50 or the remote satellite system 60 may transmit a command to the electronic control system 12 of the platooning vehicle 10 to annunciate an emergency to the other non-platooning and/or non-communicative other vehicles on the roadway such as for example by generating light signals according to a predetermined emergency light signal display pattern or protocol.

In addition to the above, the electronic control systems 12, 12' of each vehicle 10, 20 operates to perform various vehicle-to-(single)vehicle (V2V Unicast) communication (communication between a broadcasting vehicle and a single responding vehicle), as well as various vehicle-to-(multiple) vehicle (V2V Broadcast) communication (communication between a broadcasting vehicle and two or more responding vehicles), and further as well as various vehicle-to-infrastructure (V2I) communication. Preferably, the local V2V Unicast and V2V Broadcast communication follows the J2945 DSRC communications specification. In this regard, the vehicles forming the basic platoon P can communicate with each other locally for self-ordering and spacing into a platoon without the need for input from the NOC in accordance with the embodiments herein. For example, the vehicles forming the basic platoon P can communicate a first light signal pattern representative of a first mode to the other non-platooning and/or non-communicative vehicles on the roadway via an annunciator system of the example embodiment when it is determined by logic executing in the leading vehicle 10 that the vehicle is currently platooning, and that the vehicle 10 currently platooning is connected to the vehicle 20 behind it. The platooning vehicles may further communicate a second light signal pattern representative of a second mode to the other non-platooning and/or non-communicative vehicles on the roadway via the annunciator system of the example embodiment when it is determined by logic executing in the training vehicle 20 that the vehicle is currently platooning, and that the vehicle 20 currently platooning is connected to the vehicle 10 ahead of it. The platooning vehicles may further communicate a third light signal pattern representative of a third mode to the other non-platooning and/or non-communicative vehicles on the roadway via the annunciator system of the example embodiment when it is determined by logic executing in the training vehicle 20 that the vehicle is currently platooning, and that the vehicle 20 can accept another trailing vehicle to be added to the platoon. The platooning vehicles may further communicate a fourth light signal pattern representative of a fourth mode to the other non-platooning and/or non-communicative vehicles on the roadway via the annunciator system of the example embodiment when it is determined by logic executing in the training vehicle 20 that the vehicle is currently platooning, and that the vehicle 20 cannot accept another trailing vehicle to be added to the platoon. The vehicles forming the basic platoon P can also communicate with one or more other vehicles locally without the need for input from the NOC for negotiating the one or more other vehicles into the platoon in accordance with the embodiments herein. The vehicles forming the basic platoon P can further communicate with a fleet management facility remotely as may be necessary and/or desired for ordering into a platoon in accordance with further example embodiments herein.

As noted above, preferably, the local V2V Unicast and V2V Broadcast communication between vehicles as will be described herein follows the J2945 DSRC communications specification. This specification at present, does not define one-to-one vehicle communications. Rather, operationally, each communication-capable vehicle sends the needed information by a broadcast to every other communication-capable vehicle within range, and the receiving vehicle(s) decide if they want to process the received message. For example only vehicles who are platoon capable and the driver has indicated, via a switch or user interface, that joining a platoon is desired, that vehicle will start broadcasting and listening for the Platoon protocol messages. All other non-platooning and/or non-communicative vehicles on the roadway or in the area will be unable to receive the platoon information. Accordingly, as will be used herein and for purposes of describing the example embodiments, "V2V Unicast" communication will refer to communication between a broadcasting vehicle and a single responding vehicle, and "V2V Broadcast communication" will refer to communication between a broadcasting vehicle and two or more responding vehicles. It is to be appreciated that "V2V Unicast" communication also refers to one-to-one direct vehicle communications as the J2945 DSRC communications specification is further developed or by use of any one or more other standards, specifications, or technologies now known or hereinafter developed.

Figure 2:
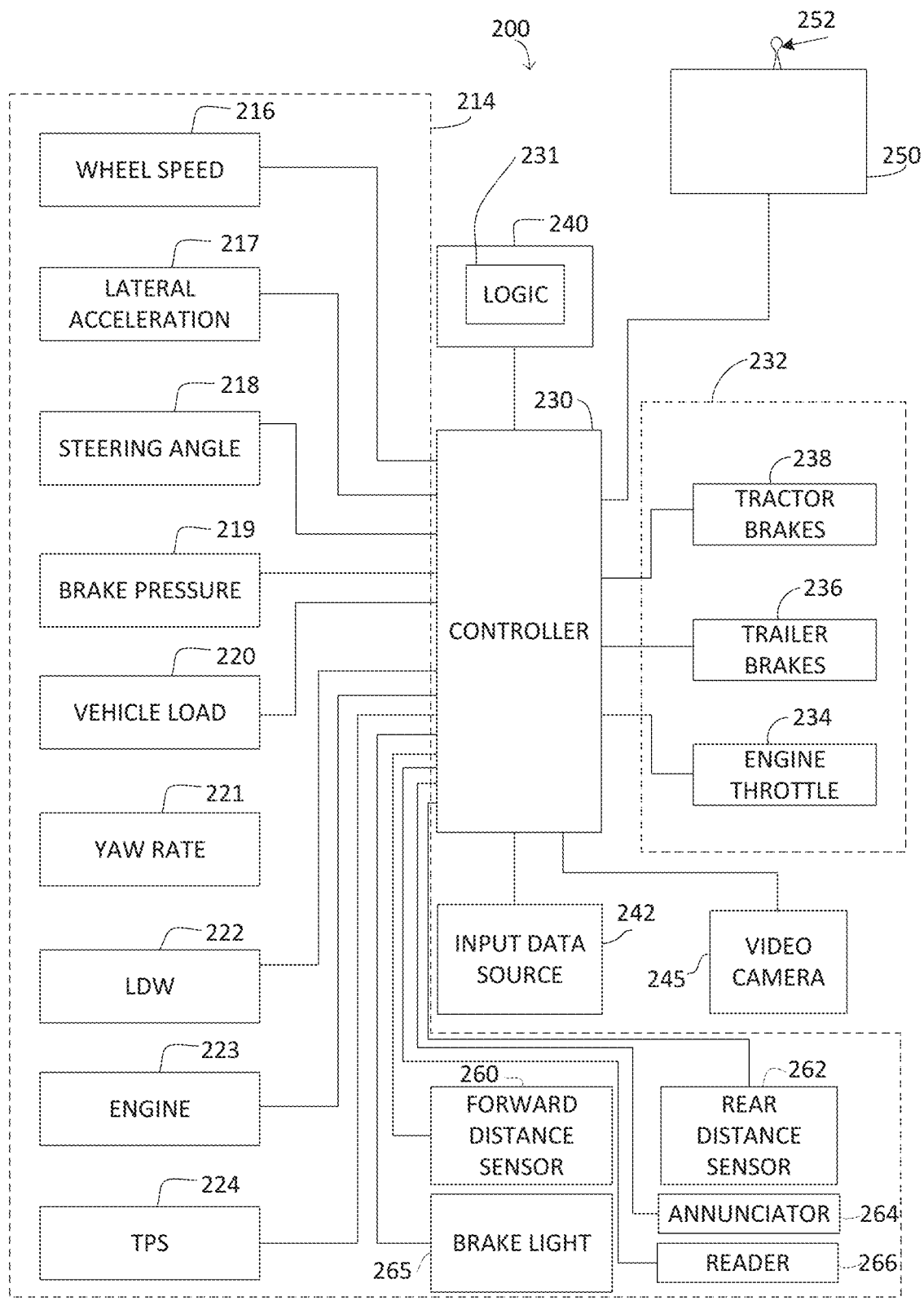
FIG. 2 is a schematic illustration of an exemplary embodiment of a data collection and communication module portion of the subject platooning traffic annunciator system according to the example embodiment.

With reference next to FIG. 2, a schematic representation of a data collection and communication module portion 200 of the subject system for platooning operation annunciation to non-platooning traffic vehicles according to principles of the example embodiment is illustrated. The data collection and communication module 200 may be adapted to detect, monitor, control, and report a variety of operational parameters and conditions of the commercial vehicle and the driver's interaction therewith, and to selectively intervene and take corrective action as may be needed or desired such as, for example, to maintain vehicle stability, perform adaptive cruise control (ACC) functions for maintaining a safe relative distance between the vehicle and a forward vehicle, perform collision mitigation (CM) control functions for avoiding or lessening the severity of impacts between the vehicle and vehicles forward of the host vehicle, perform transmission control, vehicle retarder control, foundation brake control, or to maintain the vehicle following distance relative to other vehicles within a platoon as examples. In the exemplary embodiment of FIG. 2, the data collection and communication module 200 may include one or more devices or systems 214 for providing input data indicative of one or more operating parameters or one or more conditions of a commercial vehicle. For example, the devices 214 may be one or more sensors, such as but not limited to, one or more wheel speed sensors 216, a lateral acceleration sensor 217, a steering angle sensor 218, a brake pressure sensor 219, a vehicle load sensor 220, a yaw rate sensor 221, a lane departure warning (LDW) sensor or system 222, one or more engine condition sensors 223, and a tire pressure (TPMS) monitoring system 224. The data collection and communication module 200 may also utilize additional devices or sensors in the exemplary embodiment including for example a forward distance sensor 260 and a rear distance sensor 262. These are useful for the ACC and CM control functions. Other sensors and/or actuators or energy generation devices or combinations thereof may be used of otherwise provided as well, and one or more devices and/or sensors may be combined into a single unit as may be necessary and/or desired. In the example embodiment illustrated, the data collection and communication module 200 includes an annunciator device 264 of the example embodiment to be described in greater detail below for indicating a platooning mode of the vehicle to other non-platooning and/or non-communicative vehicles on the roadway near the vehicle, and an annunciation reader device 266 for reading the annunciator devices of other vehicles.

The data collection and communication module 200 may also include a logic applying arrangement 230, such as a controller or processor, in communication with the one or more devices or systems 214. The controller 230 may include one or more inputs for receiving input data from the devices or systems 214. The controller 230 may be adapted to execute logic 231 stored in a non-transient memory device 240 to process the input data and compare the raw or processed input data to a stored threshold value and/or to one or more others signal and/or data. The controller 230 may also include one or more outputs for delivering a control signal to one or more vehicle systems 232 based on the comparison. The control signal may instruct the systems 232 to intervene in the operation of the vehicle to initiate corrective action, and then report this corrective action to a wireless service (not shown) or simply store the data locally to be used for determining a driver quality. For example, the controller 230 may generate and send the control signal to an engine electronic control unit or an actuating device to reduce the engine throttle 234 and slowing the vehicle down. Further, the controller 230 may send the control signal to a vehicle brake system to selectively engage the brakes. The controller 230 may send the control signal to selectively activate the brake light 265 to communicate braking information to following vehicles as may be deemed necessary or desired. In a tractor-trailer arrangement, the controller 230 may engage the brakes on one or more wheels of a trailer portion of the vehicle 236 and the brakes on one or more wheels of a tractor portion of the vehicle 238, and then report this corrective action to the wireless service or simply store the data locally to be used for determining a driver quality. A variety of corrective actions may be possible and multiple corrective actions may be initiated at the same time.

The controller 230 may also include a memory portion 240 for storing and accessing system information, such as for example logic 231 including the system control logic and control tuning logic. The memory portion 240, however, may be separate from the controller 230 or it equivalently may be integral with the controller 230 or some of the memory may be external to the controller 230 and some of the memory may reside within the controller 230. The sensors 214 and controller 230 may be part of a preexisting system or use components of a preexisting system. For example, the Bendix® ABS-6™ Advanced Antilock Brake Controller with ESP® Stability System available from Bendix Commercial Vehicle Systems LLC may be installed on the vehicle. The Bendix ESP® system may utilize some or all of the sensors described in FIG. 2. The logic component of the Bendix® ESP® system resides on the vehicle's antilock brake system electronic control unit, which may be used for the controller 230 of the example embodiment. Therefore, many of the components to support the data collection and communication module 200 of the present invention may be present in a vehicle equipped with the Bendix® ESP® system, thus, not requiring the installation of additional components. The data collection and communication module 200, however, may utilize independently installed components if desired.

The data collection and communication module 200 may also include a source of input data 242 for receiving data indicative of a configuration/condition of a commercial vehicle, data indicative of environmental conditions around the vehicle, or the like. The controller 230 may sense or estimate the configuration/condition and/or the environmental conditions around the vehicle based on the input data, and may select a control tuning mode or sensitivity based on the vehicle configuration/condition. The controller 230 may compare the operational data received from the sensors or systems 214 to the information provided by the tuning. The tuning of the system may include, but not be limited to: the nominal center of gravity height of the vehicle, look-up maps for lateral acceleration level for rollover intervention, look-up maps for yaw rate differential from expected yaw rate for yaw control interventions, steering wheel angle allowance, tire variation allowance, and brake pressure rates, magnitudes and maximums to be applied during corrective action.

A vehicle configuration/condition may refer to a set of characteristics of the vehicle which may influence the vehicle's stability (roll and/or yaw). For example, in a vehicle with a towed portion, the source of input data 242 may communicate the type of towed portion. In tractor-trailer arrangements, the type of trailer being towed by the tractor may influence the vehicle stability. This is evident, for example, when multiple trailer combinations (doubles and triples) are towed. Vehicles with multiple trailer combinations may exhibit an exaggerated response of the rearward units when maneuvering (i.e. rearward amplification). To compensate for rearward amplification, the data collection and communication module 200 may select a tuning that makes the system more sensitive (i.e. intervene earlier than would occur for a single trailer condition). The control tuning may be, for example, specifically defined to optimize the performance of the data collection and communication module for a particular type of trailer being hauled by a particular type of tractor. Thus, the control tuning may be different for the same tractor hauling a single trailer, a double trailer combination, or a triple trailer combination.

The type of load the commercial vehicle is carrying and the location of the center of gravity of the load may also influence vehicle stability. For example, moving loads such as liquid tankers with partially filled compartments and livestock may potentially affect the turning and rollover performance of the vehicle. Thus, a more sensitive control tuning mode may be selected to account for a moving load. Furthermore, a separate control tuning mode may be selectable when the vehicle is transferring a load whose center of gravity is particularly low or particularly high, such as for example with certain types of big machinery or low flat steel bars.

In addition, the controller 230 is operatively coupled with one or more video image capture devices shown in the example embodiment as a single video camera 245 representation of one or more physical video cameras disposed on the vehicle such as, for example, one video camera on each corner of the vehicle.

Still yet further, the data collection and communication module 210 may also include a transmitter/receiver (transceiver) module 250 such as, for example, a radio frequency (RF) transmitter including one or more antennas 252 for wireless communication of GPS data, one or more various vehicle configuration and/or condition data, or the like between the vehicles and one or more destinations such as, for example, to one or more wireless services 50, 60 (FIG. 1) having a corresponding receiver and antenna. The transmitter/receiver (transceiver) module 250 may include various functional parts of sub portions operatively coupled with the platoon control unit including for example a communication receiver portion, a global position sensor (GPS) receiver portion, and a communication transmitter. For communication of specific information and/or data, the communication receiver and transmitter portions may include one or more functional and/or operational communication interface portions as well.

The controller 230 is operative to communicate the acquired data to the one or more receivers in a raw data form, that is without processing the data, in a processed form such as in a compressed form, in an encrypted form or both as may be necessary or desired. In this regard, the controller 230 may combine selected ones of the vehicle parameter data values into processed data representative of higher level vehicle condition data such as, for example, data from the lateral acceleration sensor 217 may be combined with the data from the steering angle sensor 220 to determine excessive curve speed event data. Other hybrid event data relatable to the vehicle and driver of the vehicle and obtainable from combining one or more selected raw data items form the sensors includes, for example and without limitation, excessive braking event data, excessive curve speed event data, lane departure warning event data, excessive lane departure event data, lane change without turn signal event data, loss of video tracking event data, LDW system disabled event data, distance alert event data, forward collision warning event data, haptic warning event data, collision mitigation braking event data, ATC event data, ESC event data, RSC event data, ABS event data, TPMS event data, engine system event data, average following distance event data, average fuel consumption event data, and average ACC usage event data. The controller 230 may combine further selected ones of the vehicle parameter data values into processed data representative of higher level vehicle condition data such as, for example, platooning operational mode data representative of an operational mode of the vehicle in the platoon. The controller 230 may also combine selected ones of the vehicle parameter data values into further processed data representative of higher level vehicle condition data such as, for example, platooning operational mode data. The platooning operational mode data may be representative of a first mode when it is determined by logic executing in the leading vehicle 10 that the vehicle is currently platooning and that the vehicle 10 currently platooning is connected to the vehicle 20 behind it. The platooning operational mode data may also be representative of a second mode when it is determined by logic executing in the training vehicle 20 that the vehicle is currently platooning, and that the vehicle 20 currently platooning is connected to the vehicle 10 ahead of it. The platooning operational mode data further may be representative of a third mode when it is determined by logic executing in the training vehicle 20 that the vehicle is currently platooning, and that the vehicle 20 can accept another trailing vehicle to be added to the platoon. The platooning operational mode data also may be representative of a fourth mode when it is determined by logic executing in the training vehicle 20 that the vehicle is currently platooning, and that the vehicle 20 cannot accept another trailing vehicle to be added to the platoon.

Figure 3:
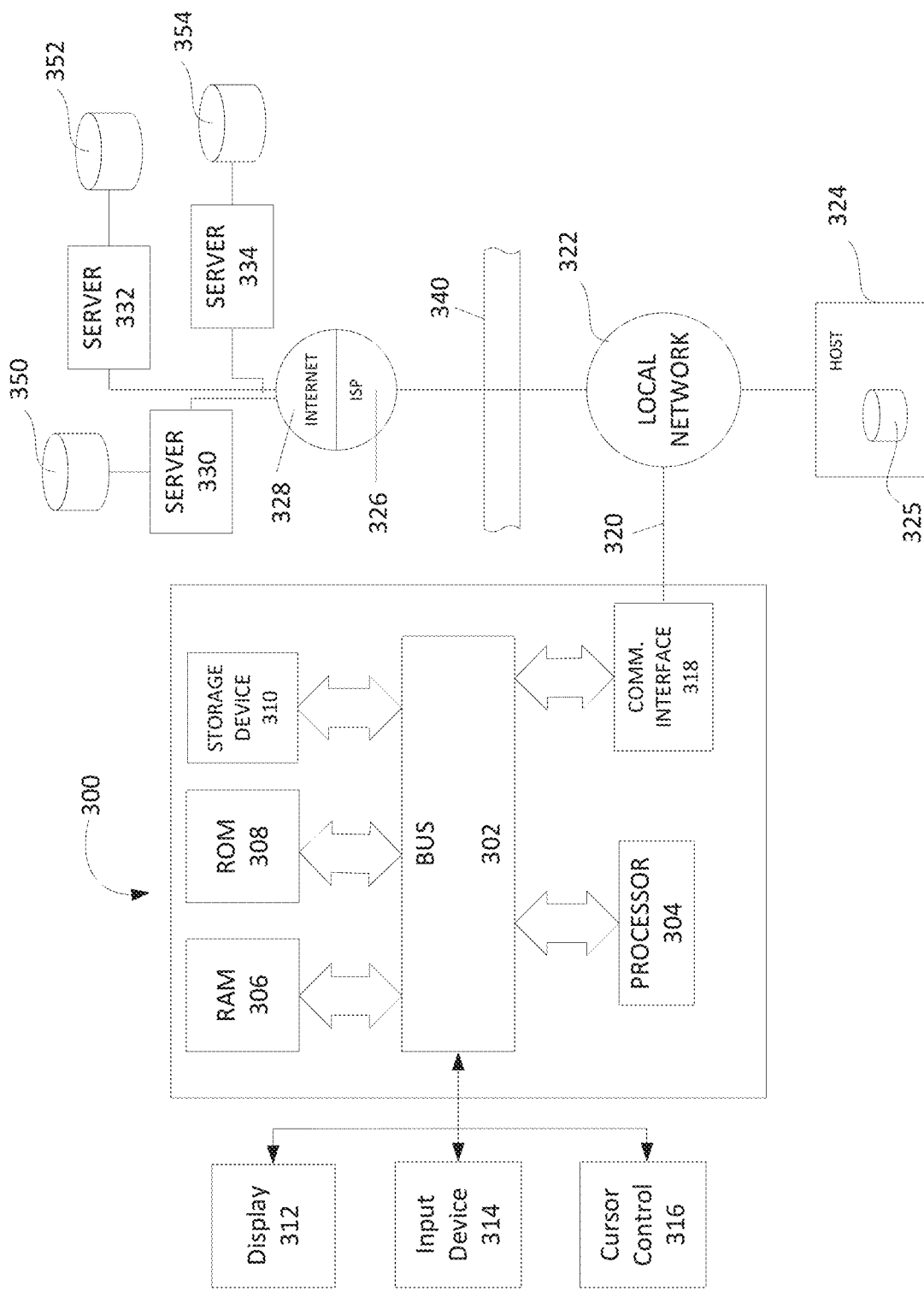
FIG. 3 is a block diagram that illustrates a computer system suitable for executing embodiments of one or more software systems or modules that perform platoon operation announcing to traffic near the platoon according to the example embodiment.

FIG. 3 is a block diagram that illustrates a platoon control computer system 300 suitable for executing embodiments of one or more software systems or modules that perform platoon initialization, redundant lane departure control, redundant communication operation, fleet management and control, and also for executing platoon mode annunciation protocol according to the subject application. The controller 230 of FIG. 2 may be in an example embodiment provided as the computer system 300 illustrated, for example. The example system 300 of the embodiment includes a bus 302 or other communication mechanism for communicating information, and a processor 304 coupled with the bus for processing information. The computer system includes a main memory, such as random access memory (RAM) 306 or other dynamic storage device for storing information and instructions to be executed by the processor 304, and read only memory (ROM) 308 or other static storage device for storing static information and instructions for the processor 304. A storage device 310 is also suitably provided for storing information and instructions.

The example embodiments described herein are related to the use of the computer system 300 for accessing, aggregating, manipulating and displaying information from multiple remote resources such as, for example, indirectly from multiple fleet vehicles 10, 20 and directly from multiple wireless services 50, 60. Further, the embodiments described herein are related to the use of computer system 300 for accessing information from the multiple sources in selective combination with internal proprietary data such as driver sensitive data, sales, costs, expense records, travel data, and the like from within a firewall 340. According to one implementation, information from the multiple remote public, commercial, and/or internal proprietary resources is provided by computer system 300 in response to the processor 304 executing one or more sequences of one or more instructions contained in main memory 306. Such instructions may be read into main memory 306 from another computer-readable medium, such as storage device 310. Execution of the sequences of instructions contained in main memory 306 causes the processor 304 to perform the process steps described herein. In an alternative implementation, hard-wired circuitry may be used in place of or in combination with software instructions to implement the invention. Thus implementations of the example embodiments are not limited to any specific combination of hardware circuitry and software.

In accordance with the descriptions herein, the term "computer-readable medium" as used herein refers to any non-transitory media that participates in providing instructions to the processor 304 for execution. Such a non-transitory medium may take many forms, including but not limited to volatile and non-volatile media. Non-volatile media includes, for example, optical or magnetic disks. Volatile media includes dynamic memory for example and does not include transitory signals, carrier waves, or the like. Common forms of computer-readable media include, for example, a floppy disk, a flexible disk, hard disk, magnetic tape, or any other magnetic medium, a CD-ROM, any other optical medium, punch cards, papertape, any other physical medium with patterns of holes, a RAM, PROM, and EPROM, a FLASH-EPROM, any other memory chip or cartridge, or any other tangible non-transitory medium from which a computer can read.

In addition and further in accordance with the descriptions herein, the term "logic", as used herein with respect to the Figures, includes hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components.

The platoon control computer system 300 includes a communication interface 318 coupled to the bus 302 which provides a two-way data communication coupling to a network link 320 that is connected to local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 supporting a database 325 storing internal proprietary data and/or to data equipment operated by an Internet Service Provider (ISP) 326. ISP 326 in turn provides data communication services through the Internet 328. Local network 322 and Internet 328 both use electric, electromagnetic or optical signals that carry digital data streams. The signals through the various networks and the signals on network link 320 and through communication interface 318, which carry the digital data to and from the platoon self-ordering computer system 300, are exemplary forms of carrier waves transporting the information.

The platoon control computer system 300 can send messages and receive data, including program code, through the network(s), network link 320 and communication interface 318. In the Internet-connected example embodiment, the platoon sensor-based anti-hacking prevention computer system 300 is operatively connected with a plurality of external public, private, governmental or commercial servers (not shown) as one or more wireless services 50, 60 configured to execute a web application in accordance with the example embodiment to be described below in greater detail. In the example embodiment shown, the first server 330 is coupled with a database 350 storing selected data received by a first wireless service such as for example data from a first telematics supplier, the second first server 332 is coupled with a database 352 storing selected data received by a second wireless service such as for example data from a second telematics supplier, and the third server 334 is coupled with a database 354 storing selected proprietary data and executable code for performing the web application. The platoon control computer system 300 is operative to selectively transmit a request for data to be selectively retrieved from the respective databases 350, 352, 354 through Internet 328, ISP 326, local network 322 and communication interface 318 or to receive selected data pushed from the databases 350, 352, 354, or by both means in accordance with the example embodiments. The received data is processed executed by the processor 304 as it is received, and/or stored in storage device 310, or other non-volatile storage for later processing or data manipulation.

Although platoon control computer system 300 is shown in FIG. 3 as being connectable to a set of three (3) servers, 330, 332, and 334, those skilled in the art will recognize that the platoon control computer system 300 may establish connections to multiple additional servers on Internet 328. Each such server in the example embodiments includes HTTP-based Internet applications, which may provide information to platoon sensor-based anti-hacking prevention computer system 300 upon request in a manner consistent with the present embodiments.

Selectively locating the proprietary commercial data in database 325 within the firewall 340 is advantageous for numerous reasons including enabling rapid comprehensive local queries without substantial network overhead. However, it is important to maintain the accuracy of the data by performing update or refresh operations on a schedule based on the characteristics of the desired data or on the data requirements of a particular query.

The platoon control computer system 300 suitably includes several subsystems or modules to perform the anti-hacking detection and prevention management as set forth herein. A primary purpose of the subject application is to provide an improved intuitive and convenient user interface which allows a user to select parameters for performing anti-hacking detection and prevention, and to make adjustments of the parameters based on the result presentation as necessary or desired.

Figure 4:
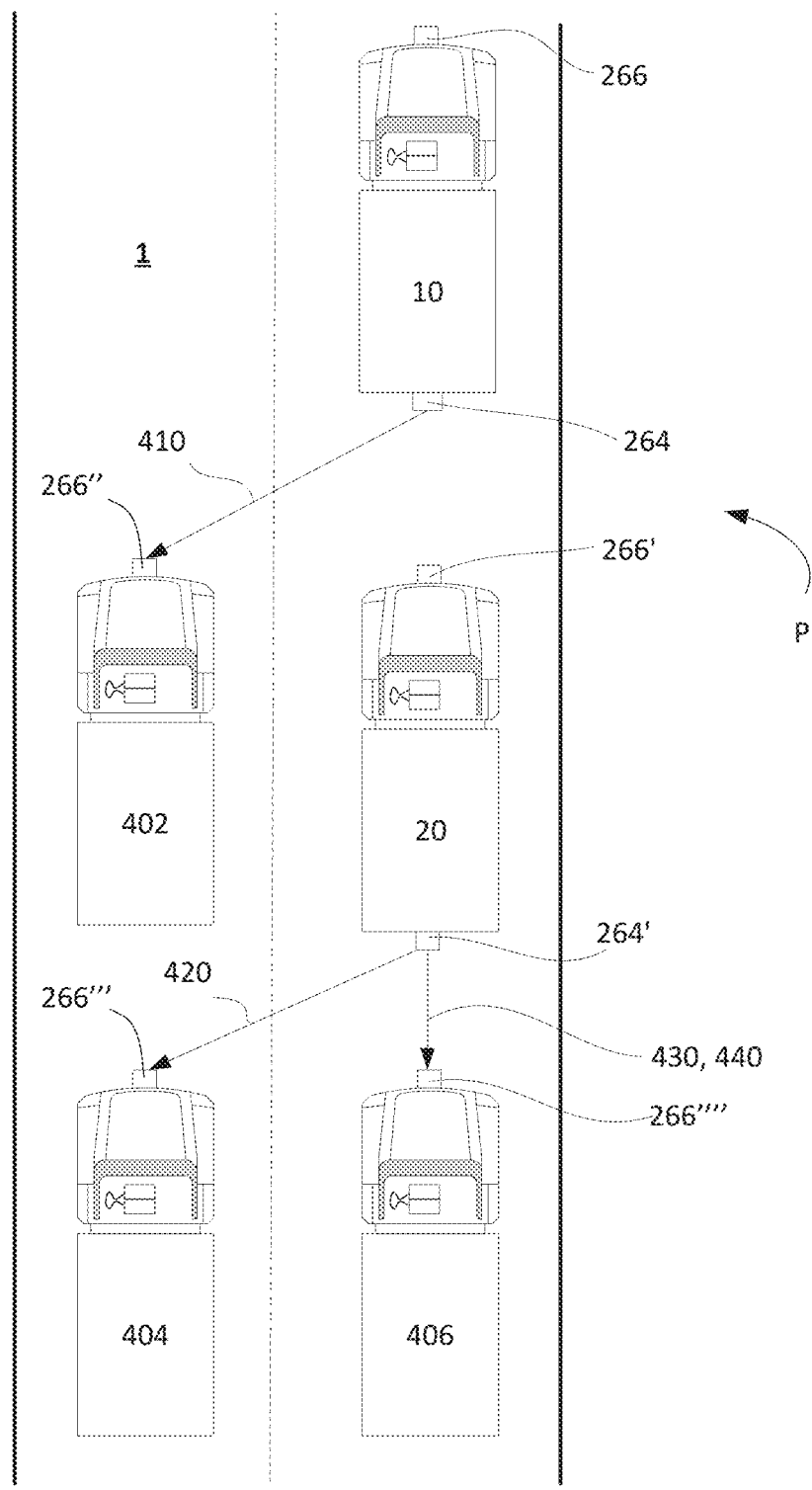
FIG. 4 is a schematic illustration of a pair of platooning vehicles generating a set of signals annunciating their platooning operation to other non-platooning and/or non-communicative vehicles on the roadway.

FIG. 4 is a schematic illustration of a pair of platooning vehicles 10, 20 generating a set of signals annunciating a mode of their platooning operation to other traffic vehicles sharing a roadway with the platooning vehicles. With reference now to that Figure, in general, the leading vehicle 10 of a platooning vehicle pair comprising the leading 10 and following 20 vehicles cooperatively travelling seriatim along a platoon P long an associated roadway 1 includes an annunciator device 264 located on a rear portion thereof and an annunciation reader device 266 located on a front portion thereof. Similarly, the following vehicle 20 of the platoon pair includes an annunciator device 264' located on a rear portion thereof and an annunciation reader device 266' located on a front portion thereof. In accordance with the embodiments described herein, the annunciator devices 264, 264' located on the rear portions of the platooning vehicles 10, 20 are part of a system used to broadcast signals representative of the platooning modes of the respective platooning vehicles 10, 20 of the platooning vehicle pair. Further in accordance with the embodiments described herein, the annunciation receiver devices 266, 266' located on the front portions of the platooning vehicles 10, 20 are part of a system used to receive and interpret the broadcasted signals from the annunciator devices 264, 264' of the respective platooning vehicles 10, 20 of the platooning vehicle pair as well as from other non-platooning and/or non-communicative vehicles on the roadway such as from vehicles belonging to other fleets and/or other owners or the like. In addition, other non-platooning vehicles 402, 404, and 406 are each similarly outfitted with an annunciation receiver device 266", 266"', and 266"" so that they may be able to receive and recognize the combination light signals generated by the platooning vehicles 10, 20. Although illustrated in the drawing Figures as being separate units, it is to be appreciated that the transmitter and receiver components of the annunciator devices 264, 264' and the annunciation receiver devices 266, 266' may be logically coupled with a common or otherwise shared processor for determining the mode of platooning operation of the vehicle upon which the device is mounted, generating signals representative of the determined platooning mode of the vehicle upon which the device is mounted, and receiving signals and determining from the received signals the mode of platooning operation of a vehicle other than the vehicle upon which the device is mounted.

As described above, the controllers 230 of the platooning vehicles 10, 20 include a processor 304 operable to execute logic 231 stored in a memory device 240 to determine a platooning mode of the respective vehicle. One platooning mode may be, for example, a first mode wherein it is determined by logic executing in the leading vehicle 10 that the vehicle is currently platooning, and that the vehicle 10 currently platooning is connected to the vehicle 20 behind it. Another platooning mode may be, for example, a second mode wherein it is determined by logic executing in the training vehicle 20 that the vehicle is currently platooning, and that the vehicle 20 currently platooning is connected to the vehicle 10 ahead of it. Yet another platooning mode may be, for example, a third mode wherein it is determined by logic executing in the training vehicle 20 that the vehicle is currently platooning, and that the vehicle 20 can accept another trailing vehicle 406 to be added to the platoon. Still yet another platooning mode may be, for example, a fourth mode wherein it is determined by logic executing in the training vehicle 20 that the vehicle is currently platooning, and that the vehicle 20 cannot accept another trailing vehicle 406 to be added to the platoon. Other vehicle arrangements for platooning are possible beyond the arrangement shown in FIG. 1 according to principles of the example embodiments including for example non-columnar formation, V-shaped formations, and others for example. In this sense therefore, the embodiments are not limited to modes described above wherein for example the first mode in a V-shaped formation may represent for example that the vehicle is currently platooning and also is connected to several laterally offset vehicles behind it, and wherein for example the second mode in the V-shaped or other more complicated formation may represent for example that the vehicle is currently platooning and also is connected to several laterally offset vehicles ahead of it.

In FIG. 4, in accordance with an example embodiment, logic executing in the leading platooning vehicle 10 may determine that the vehicle 10 is currently platooning and that the vehicle 10 is connected to the vehicle 20 behind it. Further in accordance with the example embodiment, the annunciator device 264 located on the rear portion of the vehicle 10 is configured to generate and send a signal 410 representative of the determined mode of platooning operation of the vehicle 10 indicating that the leading vehicle 10 is currently platooning, and that the vehicle 10 is connected to the vehicle 20 behind it. The signal 410 is a combination light signal (710, 712 in FIG. 7a) in the example embodiment having special fail-safe and information encoding properties as will be described in greater detail herein. The signal 410 representative of leading vehicle 10 currently platooning and being connected to the vehicle 20 behind it is useful to a first traffic vehicle 402, for example, to indicate to the traffic vehicle 402 that it might not be suggested for the traffic vehicle 402 to try to intervene between the leading vehicle 10 and the following vehicle 20.

Also in FIG. 4 in accordance with an example embodiment, logic executing in the following vehicle 20 may determine that the vehicle 20 is currently platooning and that the vehicle 20 is connected to the vehicle 10 ahead of it. Further in accordance with the example embodiment, the annunciator device 264' located on the rear portion of the vehicle 20 is configured to generate and send a signal 420 representative of the determined mode of platooning operation of the vehicle 20 indicating that the following vehicle 20 is currently platooning, and that the vehicle 20 is connected to the vehicle 10 ahead of it. The signal 420 is a second combination light signal (720, 722 in FIG. 7b) in the example embodiment having special fail-safe and information encoding properties as will be described in greater detail herein. The signal 420 representative of following vehicle 20 currently platooning and being connected to the vehicle 10 ahead of it is useful to the traffic vehicle 404, for example, to indicate to the traffic vehicle 404 that it might not be suggested for the traffic vehicle 404 to try to intervene between the leading vehicle 10 and the following vehicle 20.

Still further in FIG. 4, the following vehicle 20 may generate and send a signal 430 indicating that the following vehicle 20 is currently platooning, and that the platoon P can add another vehicle behind it (the following vehicle 20). The signal 430 is useful to a third traffic vehicle 406 for indicating to the traffic vehicle 406 that it may begin a protocol to join the platoon, if desired by the third traffic vehicle 406. In accordance with this example embodiment, logic executing in the following vehicle 20 may determine that the vehicle 20 is currently platooning and that the platoon P can add another vehicle behind the following vehicle 20. Further in accordance with the example embodiment, the annunciator device 264' located on the rear portion of the vehicle 20 is configured to generate and send a signal 430 representative of the determined mode of platooning operation of the vehicle 20 indicating that the following vehicle 20 is currently platooning, and that the platoon P can add another vehicle behind the following vehicle 20. The signal 430 is a third combination light signal (730, 732 in FIG. 7c) in the example embodiment having special fail-safe and information encoding properties as will be described in greater detail herein. The signal 430 representative of following vehicle 20 currently platooning and being able to add another vehicle behind the following vehicle 20 is useful to the traffic vehicle 406, for example, to indicate to the traffic vehicle 406 that it might join the platoon using suitable protocol as may be necessary and/or desired.

Similarly, the following vehicle 20 may generate and send a signal 440 indicating that the following vehicle 20 is currently platooning, and that the platoon P cannot add another vehicle behind it (the following vehicle 20). The signal 440 is useful to the third traffic vehicle 406 for indicating to the traffic vehicle 406 that it may not begin a protocol to join the platoon. In accordance with this example embodiment, logic executing in the following vehicle 20 may determine that the vehicle 20 is currently platooning and that the platoon P cannot add another vehicle behind the following vehicle 20. Further in accordance with the example embodiment, the annunciator device 264' located on the rear portion of the vehicle 20 is configured to generate and send a signal 440 representative of the determined mode of platooning operation of the vehicle 20 indicating that the following vehicle 20 is currently platooning, and that the platoon P cannot add another vehicle behind the following vehicle 20. The signal 440 is a fourth combination light signal (740, 742 in FIG. 7d) in the example embodiment having special fail-safe and information encoding properties as will be described in greater detail herein. The signal 440 representative of following vehicle 20 currently platooning and being unable to add another vehicle behind the following vehicle 20 is useful to the traffic vehicle 406, for example, to indicate to the traffic vehicle 406 that it will not be permitted to join the platoon.

Figure 5A:
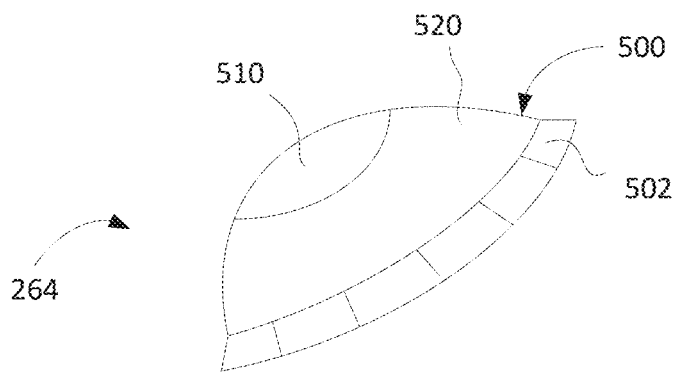
FIGS. 5a-5c are schematic illustrations of a platoon annunciator device for annunciating platooning operation according to the example embodiment.
Figure 5B:
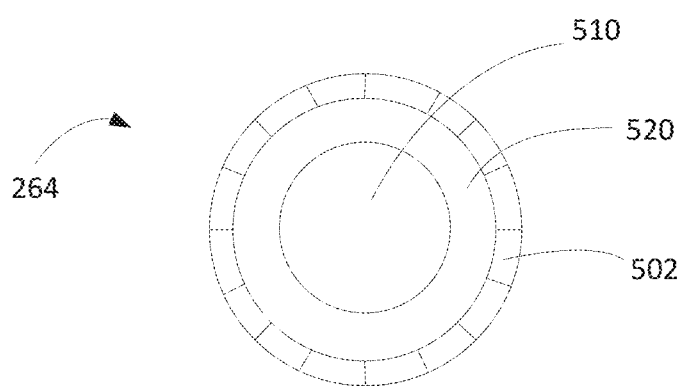
Figure 5C:
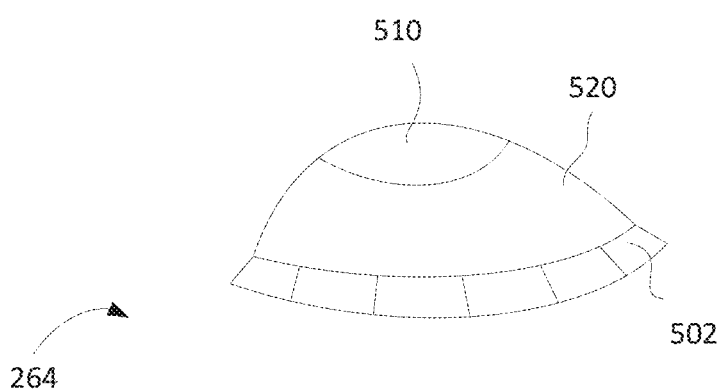

FIGS. 5a-5c are schematic illustrations of a platoon annunciator device 264 for annunciating platooning operation according to an example embodiment. The annunciator device 264 of the example embodiment has a general dome shape 500 to assist in 360° visibility of light signals emanating therefrom. The light signals emitted from the annunciator device 264 encode information informative of the platooning mode of the vehicle emitting the signal. The annunciator device 264 of the example embodiment also includes a housing 502 supporting a first lens 510 and a second lens 520. The platoon annunciator device 264 is preferably installed at the rear of platooning capable commercial vehicles as shown, for example in FIG. 4. The annunciator device is preferably a low intensity indicator that does not shine the emitted light signals directly at following or surrounding traffic. For good results and for reasons including compliance with various laws relating to the operation of vehicles on public roadways, the annunciator should be mounted in an unambiguous location so that it is not confused with other vehicle lamps. In the example embodiment, owing to the generally domed-shape of the annunciator, it is visible to traffic behind and to the sides (passing vehicles). The annunciator of the example embodiment is capable of displaying two (2) light signals simultaneously for a first predetermined time period. This provides for a fail-safe integrity of the combination light signal. Then, for a second predetermined time period after the first time period, the annunciator displays only one (1) of the light signals or neither of the light signals. This encodes the platooning operational mode data in the combination light signal protocol. In an embodiment the light signals may be visible colors light signals such as, for example, green and yellow. In the embodiment illustrated, the first lens 510 is a yellow lens, and the second lens 520 is a green lens. In that way, regular full spectrum bulbs may be used within the housing. Alternatively, the annunciator device 264 may be formed having clear first and second lenses 510, 520, and fitted with bulbs or other forms of light source capable of emitting light having defined colors. In addition, the annunciator device may be capable of emitting light outside of the spectrum visible to humans such as in the infrared range and/or the ultraviolet range. Different combinations of light spectrum ranges may be used based on application wherein for example human visible light may be best on commercial vehicles, but infrared light signal may be better when operating the vehicle at nighttime.

It is to be appreciated that drivers of unconnected vehicles such as cars, trucks, and law enforcement and/or safety vehicles are generally unaware of the status of a vehicle within a chain of platooning trucks. Drivers of these unconnected vehicles may want to know whether a particular vehicle is platooning with another vehicle, or simply tailgating. Drivers of these unconnected vehicles may further want to know whether they can add their vehicle into any given platooning chain, or whether they should avoid moving their vehicle in between two vehicles that might (and might not) be platooning. Drivers looking to connect into a platoon can see if a given platoon chain in front of them is available to be connected to. The annunciator of the example embodiment being capable of displaying the two (2) colors as described, may inform the unconnected drivers of all of these statuses, and others as may be necessary and/or desired.

To the above end and with reference next to FIG. 6, a Table 600 showing a platooning operation logical light signal illumination annunciation scheme according to the example embodiment will be described. The embodiments provide for a fail-safe integrity of the combination light signal as a dual authentication of the light signals wherein light signals of both a first light signal range and a second light signal range must be seen by an annunciation signal receiving device on the receiving vehicle in order to verify that the received light signals are indeed being broadcast for purposes of transmitting information relating to the platooning mode. Overall, the annunciator of the example embodiment is capable of displaying two (2) light signals simultaneously for a first predetermined time period. This provides for a fail-safe integrity of the combination light signal. Then, for a second predetermined time period after the first time period, the annunciator displays only one (1) of the light signals or neither of the light signals. This encodes the platooning operational mode data in the combination light signal protocol. As shown in the Table 600, certain modes in the MODE column 608 are represented with an "X" entry indicating that the logical combination of light signals as represented in columns 602 and 604 are not viable in accordance with the example embodiment since these combinations either: fail to display two (2) light signals simultaneously for a first predetermined time period, fail to display only one (1) of the light signals or neither of the light signals for a second predetermined time period after the first time period, or both fail to display the two (2) light signals simultaneously for the first predetermined time period and fail to display only one (1) of the light signals or neither of the light signals for the second predetermined time period after the first time period. These occurrences are marked in the VIABLE? Column 606 of the Table 600 with a "NO" indicia.

In accordance with the example embodiments described herein, the dual authentication relates to light signals wherein two selected light signal spectrum ranges must be received by an annunciation signal receiving device on the receiving vehicle in order to verify that the received light signals are indeed being broadcast for purposes of transmitting information relating to the platooning mode. Otherwise, blinking or random other light signals or other lights might be misinterpreted as platoon mode information by other vehicles on the road. In the embodiment, a first level of authentication is provided by the particular light signal spectrum ranges selected to be displayed. Also in the embodiment, a second level of authentication is provided by the pair of light signal spectrum ranges being broadcast simultaneously, at least for a brief selectable period. In that way, random single light signal flashes from extraneous sources that do not overlap in time, will not be confused with viable platoon mode annunciation signals originating from the platoon annunciator device 264 for annunciating platooning operation according to the example embodiment.

In accordance with the particular example embodiments described herein, the dual authentication relates to visible light signals such as green and yellow, wherein two selected visible colors must be seen by an annunciation signal receiving device on the receiving vehicle in order to verify that the received colors are indeed being broadcast for purposes of transmitting information relating to the platooning mode. Otherwise, blinking or random green and/or yellow light(s) might be misinterpreted as platoon mode information by other vehicles on the road. In the embodiment, a first level of authentication is provided by the particular colors selected to represent the visible signal. In the example embodiment, visible light signals are used and, more particularly, green and yellow visible signals are selected. However, it is to be appreciated that other color pairs may be selected as necessary and/or desired such as for example for use in specialized environments such as in a snowy environment, in hot dry environments, or the like. In this way, the annunciation signal receiving device on the receiving vehicle will not be misguided into reacting to color signals that are not in the green or yellow predetermined spectrums. Also in the embodiment, a second level of authentication is provided by the visible color pair being broadcast simultaneously, at least for a brief selectable period. In that way, random single green and yellow flashes from extraneous sources that do not overlap in time, will not be confused with viable platoon mode annunciation signals originating from the platoon annunciator device 264 for annunciating platooning operation according to the example embodiment.

The Table 600 includes a first column 602 representative of a first light signal having a visible color in the example embodiment such as for example, green, and a second column 604 representative of a second light signal having a visible color in the example embodiment such as for example yellow. The platoon annunciator device 264 of the example embodiment is operable to generate the visible colors by displaying the green signal Color#1 in a steady state condition as a logical "ON" or by flashing the green signal as a logical "PULSE." Similarly, the platoon annunciator device 264 of the example embodiment is operable to display the yellow signal Color #2 in a steady state condition as a logical "ON" or by flashing the yellow signal as a logical "PULSE."

Entries in the third column 606 of the Table 600 represent viability of the combinations set out in the first two columns 602, 604 with regard to the dual authentication feature of the embodiment for preventing false reads by traffic vehicles. In this regard, a first platooning mode MODE_1 may be communicated when both visible color signals COLOR #1 and COLOR #2 are set to a logical "ON"—that is, when both visible color signals COLOR #1 and COLOR #2 are illuminated simultaneously for a predetermined period. MODE_1 may represent, for example, a signal 410 to be generated by the annunciator device 246 indicating that the leading vehicle 10 is currently platooning, and that the vehicle 10 is connected to the vehicle 20 behind it. In accordance with the example embodiment, logic executing in the leading platooning vehicle 10 determines that the vehicle 10 is currently platooning and that the vehicle 10 is connected to the vehicle 20 behind it. Further in accordance with the example embodiment, the annunciator device 264 located on the rear portion of the vehicle 10 is configured to generate and send a signal 410 representative of the determined mode of platooning operation of the vehicle 10 indicating that the leading vehicle 10 is currently platooning, and that the vehicle 10 is connected to the vehicle 20 behind it. The signal 410 is a combination light signal of both visible color signals COLOR #1 and COLOR #2 in the example embodiment having special fail-safe property wherein in order for the signal to be viable to other vehicles both visible color signals COLOR #1 and COLOR #2 are illuminated simultaneously for a predetermined period. The combination light signal 410 of the example embodiment also has information encoding properties wherein, as shown in the Table of FIG. 6, the first platooning mode MODE_1 is communicated when both visible color signals COLOR #1 and COLOR #2 are set to a logical "ON"—that is, when both visible color signals COLOR #1 and COLOR #2 are illuminated simultaneously for a predetermined period.

A second platooning mode MODE_2 may be communicated when the first visible color signal COLOR #1 is set to a logical "ON"—that is, when the first visible color signal COLOR #1 is illuminated for a predetermined period, and the second visible color signal COLOR #2 is set to a logical "FLASH"—that is, when the second visible color signal COLOR #2 is alternately illuminated and extinguished for a predetermined period. MODE_2 may represent, for example, a signal 420 to be generated by the annunciator device 246 indicating that the following vehicle 20 is currently platooning, and that the vehicle 20 is connected to the vehicle 10 ahead of it. In accordance with the example embodiment, logic executing in the following vehicle 20 determines that the vehicle 20 is currently platooning and that the vehicle 20 is connected to the vehicle 10 ahead of it. Further in accordance with the example embodiment, the annunciator device 264' located on the rear portion of the vehicle 20 is configured to generate and send a signal 420 representative of the determined mode of platooning operation of the vehicle 20 indicating that the following vehicle 20 is currently platooning, and that the vehicle 20 is connected to the vehicle 10 ahead of it. The signal 420 is a combination light signal of both visible color signals COLOR #1 and COLOR #2 in the example embodiment having special fail-safe property wherein in order for the signal to be viable to other vehicles both visible color signals COLOR #1 and COLOR #2 are illuminated simultaneously for a predetermined period. The combination light signal 420 of the example embodiment also has information encoding properties wherein, as shown in the Table of FIG. 6, the second platooning mode MODE_2 is communicated when the first visible color signal COLOR #1 is set to a logical "ON"— that is, when the first visible color signal COLOR #1 is illuminated for a predetermined period, and the second visible color signal COLOR #2 is set to a logical "FLASH"—that is, when the second visible color signal COLOR #2 is alternately illuminated and extinguished for a predetermined period.

A third platooning mode MODE_3 may be communicated when the first visible color signal COLOR #1 is set to a logical "FLASH"—that is, when the first visible color signal COLOR #1 is alternately illuminated and extinguished for a predetermined period, and the second visible color signal COLOR #2 is set to a logical "ON"—that is, when the second visible color signal COLOR #2 is illuminated for a predetermined period. MODE_3 may represent, for example, a signal 430 to be generated by the annunciator device 246 indicating that the following vehicle 20 is currently platooning, and that the platoon P can add another vehicle behind it (the following vehicle 20). In accordance with this example embodiment, logic executing in the following vehicle 20 determines that the vehicle 20 is currently platooning and that the platoon P can add another vehicle behind the following vehicle 20. Further in accordance with the example embodiment, the annunciator device 264' located on the rear portion of the vehicle 20 is configured to generate and send a signal 430 representative of the determined mode of platooning operation of the vehicle 20 indicating that the following vehicle 20 is currently platooning, and that the platoon P can add another vehicle behind the following vehicle 20. The signal 430 is a combination light signal of both visible color signals COLOR #1 and COLOR #2 in the example embodiment having special fail-safe property wherein in order for the signal to be viable to other vehicles both visible color signals COLOR #1 and COLOR #2 are illuminated simultaneously for a predetermined period. The combination light signal 430 of the example embodiment also has information encoding properties wherein, as shown in the Table of FIG. 6, the third platooning mode MODE_3 is communicated when the first visible color signal COLOR #1 is set to a logical "FLASH"—that is, when the first visible color signal COLOR #1 is alternately illuminated and extinguished for a predetermined period, and the second visible color signal COLOR #2 is set to a logical "ON"—that is, when the second visible color signal COLOR #2 is illuminated for a predetermined period.

Lastly, a fourth platooning mode MODE_4 may be communicated when the first visible color signal COLOR #1 is set to a logical "FLASH"—that is, when the first visible color signal COLOR #1 is alternately illuminated and extinguished for a predetermined period, and the second visible color signal COLOR #2 is set to a logical "FLASH"—that is, when the second visible color signal COLOR #2 is alternately illuminated and extinguished for a predetermined period. MODE_4 may represent, for example, a signal 440 to be generated by the annunciator device 246 indicating that the following vehicle 20 is currently platooning, and that the platoon P cannot add another vehicle behind it (the following vehicle 20). In accordance with this example embodiment, logic executing in the following vehicle 20 determines that the vehicle 20 is currently platooning and that the platoon P cannot add another vehicle behind the following vehicle 20. Further in accordance with the example embodiment, the annunciator device 264' located on the rear portion of the vehicle 20 is configured to generate and send a signal 440 representative of the determined mode of platooning operation of the vehicle 20 indicating that the following vehicle 20 is currently platooning, and that the platoon P cannot add another vehicle behind the following vehicle 20. The signal 440 is a combination light signal of both visible color signals COLOR #1 and COLOR #2 in the example embodiment having special fail-safe property wherein in order for the signal to be viable to other vehicles both visible color signals COLOR #1 and COLOR #2 are illuminated simultaneously for a predetermined period. The combination light signal 440 of the example embodiment also has information encoding properties wherein, as shown in the Table of FIG. 6, the fourth platooning mode MODE_4 is communicated when the first visible color signal COLOR #1 is set to a logical "FLASH"—that is, when the first visible color signal COLOR #1 is alternately illuminated and extinguished for a predetermined period, and the second visible color signal COLOR #2 is set to a logical "FLASH"—that is, when the second visible color signal COLOR #2 is alternately illuminated and extinguished for a predetermined period.

Figure 7A:
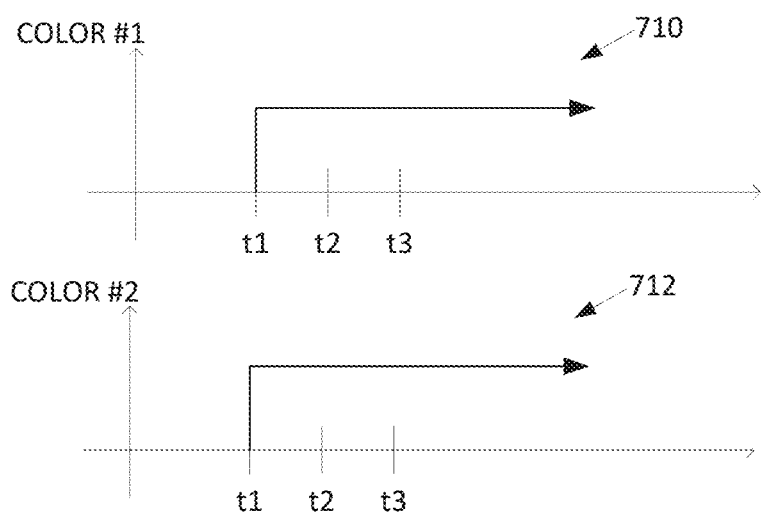
FIGS. 7a-7d are diagrams showing the timing of light signal patterns emitted from the platoon annunciator device of FIGS. 5a-5c when performing the platooning annunciation scheme of FIG. 6 according to the example embodiment.
Figure 7B:
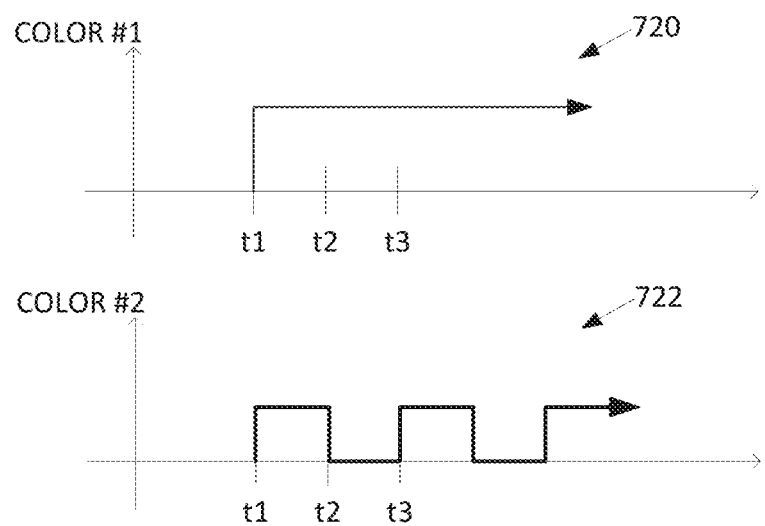
Figure 7C:
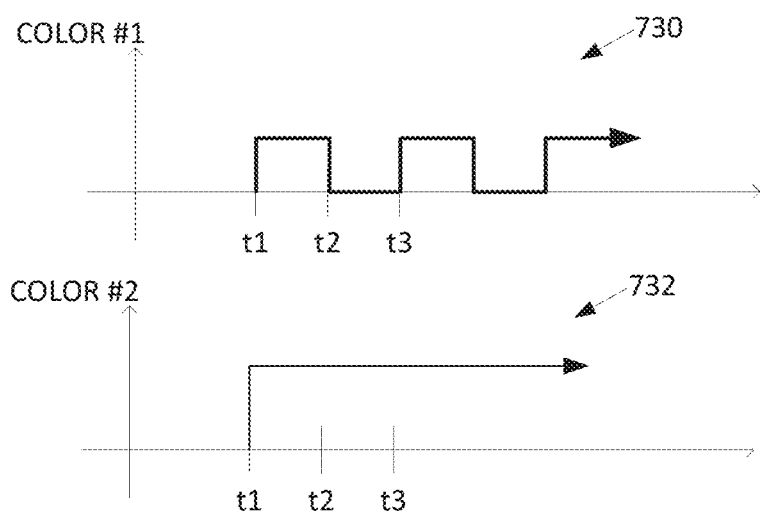
Figure 7D:
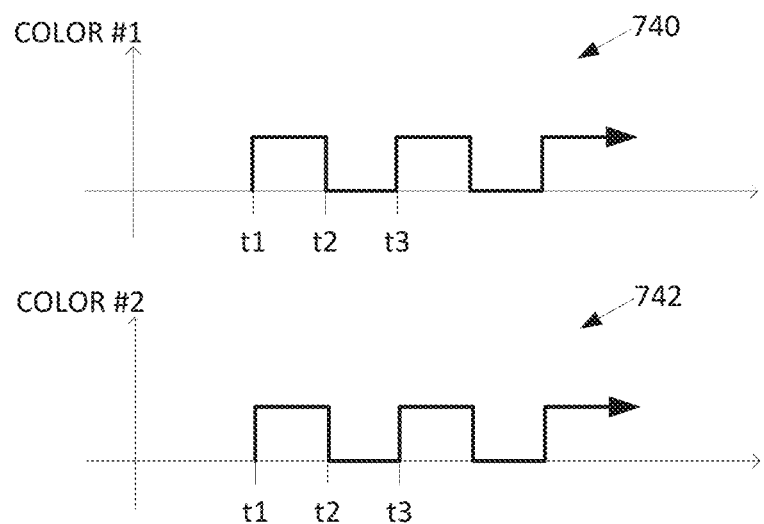

FIGS. 7a-7d are timing diagrams showing the platoon annunciator device of FIGS. 5a-5c performing the platooning annunciation scheme of FIG. 6 according to the example embodiment. More particularly, FIG. 7a is a timing diagram showing the platoon annunciator device of FIGS. 5a-5c performing the platooning annunciation scheme of FIG. 6 according to MODE_1 of the example embodiment described above. FIG. 7b is a timing diagram showing the platoon annunciator device of FIGS. 5a-5c performing the platooning annunciation scheme of FIG. 6 according to MODE_2 of the example embodiment, FIG. 7c is a timing diagram showing the platoon annunciator device of FIGS. 5a-5c performing the platooning annunciation scheme of FIG. 6 according to MODE_3 of the example embodiment, and FIG. 7d is a timing diagram showing the platoon annunciator device of FIGS. 5a-5c performing the platooning annunciation scheme of FIG. 6 according to MODE_4 of the example embodiment. as can be seen, therefore, the platoon annunciator device of FIGS. 5a-5c performing the platooning annunciation scheme of FIG. 6 according to the example embodiment is capable of displaying two (2) light signals simultaneously for a first predetermined time period t1-t2, t3-t4, t5-t5, etc. This provides for a fail-safe integrity of the combination light signal. Then, for a second predetermined time period t2-t3, t4-t5, t6-t7, etc. after the first time period t1-t2, t3-t4, t5-t5, etc., the annunciator displays only one (1) of the light signals or neither of the light signals. This encodes the platooning operational mode data in the combination light signal protocol. It is to be appreciated that different combinations of light spectrum ranges may be used outside of the visible spectrum based on application, but wherein however example human visible light may be best on commercial vehicles that are likely to encounter other non-platooning and/or non-communicative vehicles on the roadway, but infrared light signals may be better when operating the vehicle at nighttime wherein the commercial vehicles are more likely to encounter only other platooning and/or communicative vehicles on the roadway.

In FIG. 7a, the first visual color signal is illuminated as shown 710 by generating the first visual color signal at a time t1, and sustaining the first visual color signal through a predetermined time period t1-t2 and beyond through a time t3. Similarly, the second visual color signal is illuminated as shown 712 by generating the second visual color signal at a time t1, and sustaining the second visual color signal through the predetermined time period t1-t2 and beyond through the time t3. MODE_1 of FIG. 7a may represent, for example, a signal 410 to be generated by the annunciator device 246 indicating that the leading vehicle 10 is currently platooning, and that the vehicle 10 is connected to the vehicle 20 behind it.

In FIG. 7b, the first visual color signal is illuminated as shown 720 by generating the first visual color signal at the time t1, and sustaining the first visual color signal through the predetermined time period t1-t2 and beyond through the time t3. However, the second visual color signal is illuminated as shown 722 by generating the second visual color signal at a time t1, and sustaining the second visual color signal only through the predetermined time period t1-t2, wherein the second visual color signal is extinguished at the time t3. MODE_2 of FIG. 7b may represent, for example, a signal 420 to be generated by the annunciator device 246 indicating that the following vehicle 20 is currently platooning, and that the vehicle 20 is connected to the vehicle 10 ahead of it.

In FIG. 7c, the first visual color signal is illuminated as shown 730 by generating the first visual color signal at the time t1, and sustaining the first visual color signal only through the predetermined time period t1-t2, wherein the first visual color signal is extinguished at the time t3. The second visual color signal is illuminated as shown 732 by generating the second visual color signal at a time t1, and sustaining the second visual color signal through the predetermined time period t1-t2 and beyond through the time t3. MODE_3 of FIG. 7c may represent, for example, a signal 430 to be generated by the annunciator device 246 indicating that the following vehicle 20 is currently platooning, and that the platoon P can add another vehicle behind it (the following vehicle 20).

In FIG. 7d, the first visual color signal is illuminated as shown 740 by generating the first visual color signal at the time t1, and sustaining the first visual color signal only through the predetermined time period t1-t2, wherein the first visual color signal is extinguished at the time t3. Similarly, the second visual color signal is illuminated as shown 742 by generating the second visual color signal at the time t1, and sustaining the second visual color signal only through the predetermined time period t1-t2, wherein the second visual color signal is extinguished at the time t3. MODE_4 of FIG. 7d may represent, for example, a signal 440 to be generated by the annunciator device 246 indicating that the following vehicle 20 is currently platooning, and that the platoon P cannot add another vehicle behind it (the following vehicle 20).

Figure 8:
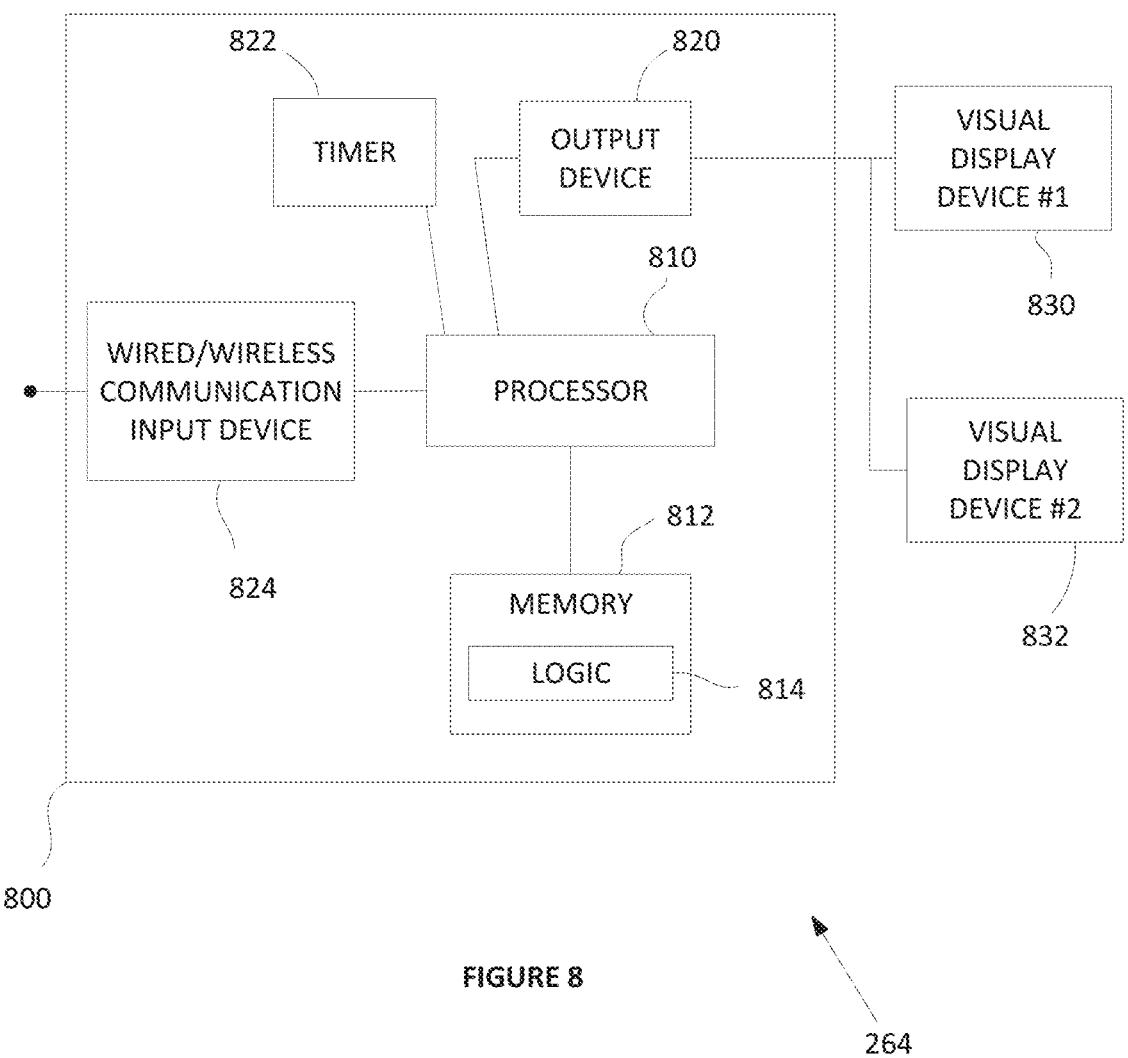
FIG. 8 is a schematic diagram illustrating a circuit used for the platoon annunciator device of FIGS. 5a-5c according to the embodiment.

FIG. 8 is a schematic diagram illustrating a circuit used for the platoon annunciator device 264 of FIGS. 5a-5c according to an embodiment. It is to be appreciated that the platoon annunciator device 264 may be hard-wired directly to the data collection and communication module portion 200 (FIG. 2). However, the platoon annunciator device 264 may be remotely located from the module portion 200 and in operative communication with the module portion 200 via a wireless communication link such as for example, a radio frequency (RF) link. This makes it easy to mount the platoon annunciator device 264 anywhere on a vehicle and to move the platoon annunciator device 264 between vehicles as may be desired.

The annunciator system 264 for annunciating a mode of a platoon operation being executed/performed between associated first and second platooning vehicles travelling cooperatively in accordance with a selected mode of the platoon operation shown in FIG. 8 includes an annunciator control unit 800 configured to be disposed in the associated first vehicle. The annunciator control unit 800 includes a processor 810 a non-transient memory device 812 operatively coupled with the processor 810, and logic 814 stored in the non-transient memory device 812 and executable by the processor 810 to determine the mode of the platoon operation being executed/performed between the associated first and second platooning vehicles. The mode may be delivered from the transmitter/receiver (transceiver) module 250 of the data collection and communication module 210, for example. Alternatively, the mode may be determined locally to the annunciator control unit 800.

Preferably, the annunciator control unit 800 is located within a housing 502 such as shown for example in FIG. 5. The annunciator system 264 further includes a first visual indicator 830 coupled with the housing and selectively generating a first visual signal having a first color based on a first visual indicator command signal, and a second visual indicator 832 coupled with the housing and selectively generating a second visual signal having a second color different than the first color based on a second visual indicator command signal. The processor 810 of the annunciator control unit 800 operates to generate the first and second visual indicator command signals based on the determined mode of the platoon operation being executed/performed between the associated first and second platooning vehicles. An output device 820 is used to buffer the control signals from the processor 810 to a level commensurate with the first and second visual output devices 830, 832. A timer 822 is used by the processor to generate pulsed signals as may be desired and as described above. In addition, a communication input device 824 is operable to interface the annunciator control unit with the data collection and communication module 210. The communication input device 824 may be ab RF link, for example.

Figure 9:
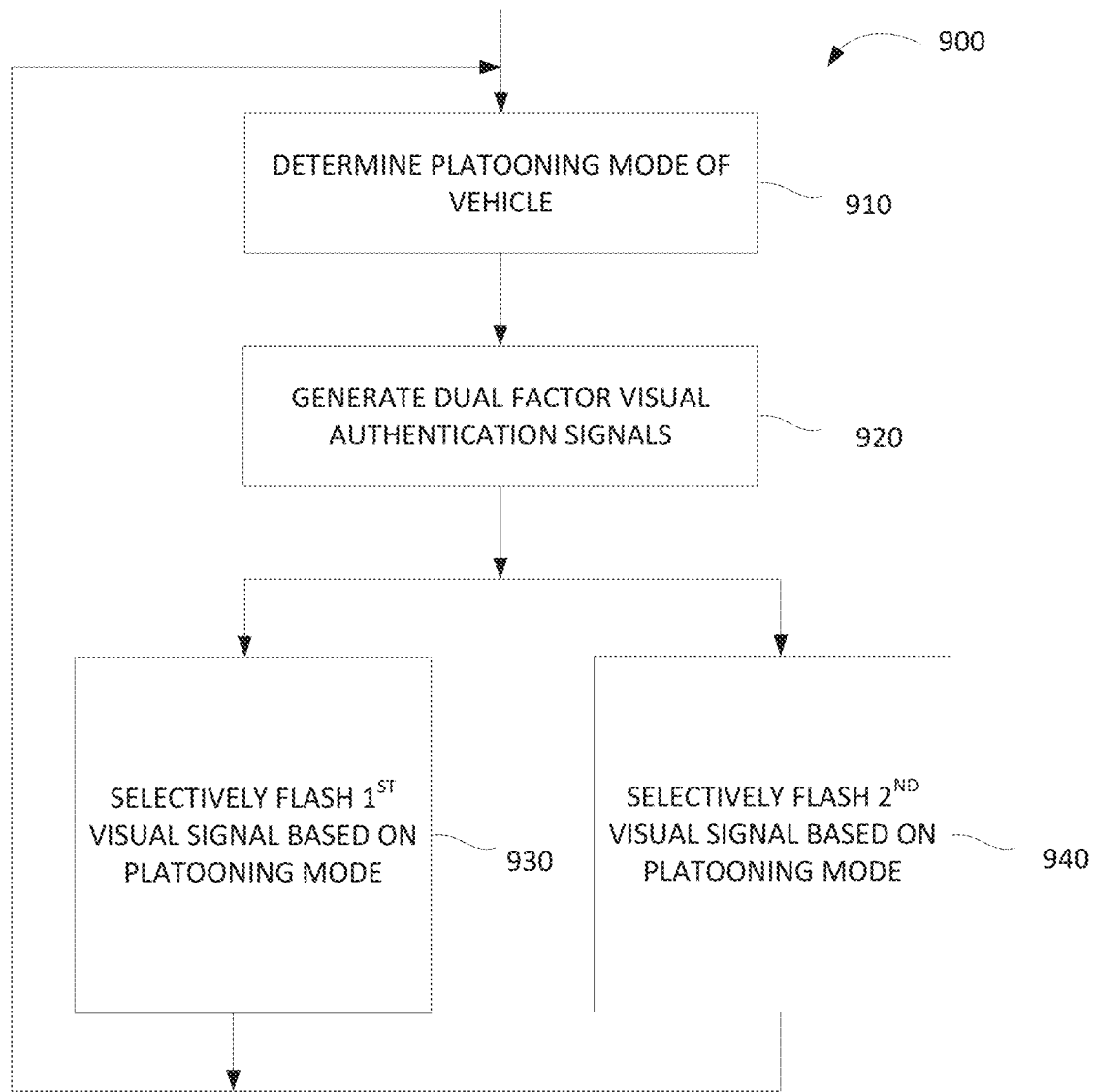
FIG. 9 is a flow diagram showing a method of annunciating platoon operation in accordance with the example embodiment.

FIG. 9 is a flow diagram showing a method 900 of annunciating platoon operation in accordance with the example embodiment. In step 910 the platooning mode of the vehicle is determined. As mentioned, the mode of the vehicle may be, for example, that the leading vehicle 10 is currently platooning, and that the vehicle 10 is connected to the vehicle 20 behind it. Further, the mode may be that the following vehicle 20 is currently platooning, and that the vehicle 20 is connected to the vehicle 10 ahead of it. In addition, the mode may be that the following vehicle 20 is currently platooning, and that the platoon P can add another vehicle behind it (the following vehicle 20). Yet still further the mode may be that the following vehicle 20 is currently platooning, and that the platoon P cannot add another vehicle behind it (the following vehicle 20).

In step 920, the dual factor authentication visual signals are generated. As described above, the visual signals may be, for example, the illumination of green and yellow lights, for example.

In steps 930 and 940 both of the visual signals are simultaneously activated for a first predetermined period t1-t2 (FIGS. 7*a*-7*d*). In that way, dual authentication of the visual signals may be obtained. Thereafter, one or both of the first and second visual signals are flashed in accordance with the embodiment and as described above with reference to FIGS. 6 and 7*a*-7*d*.

Figure 10:
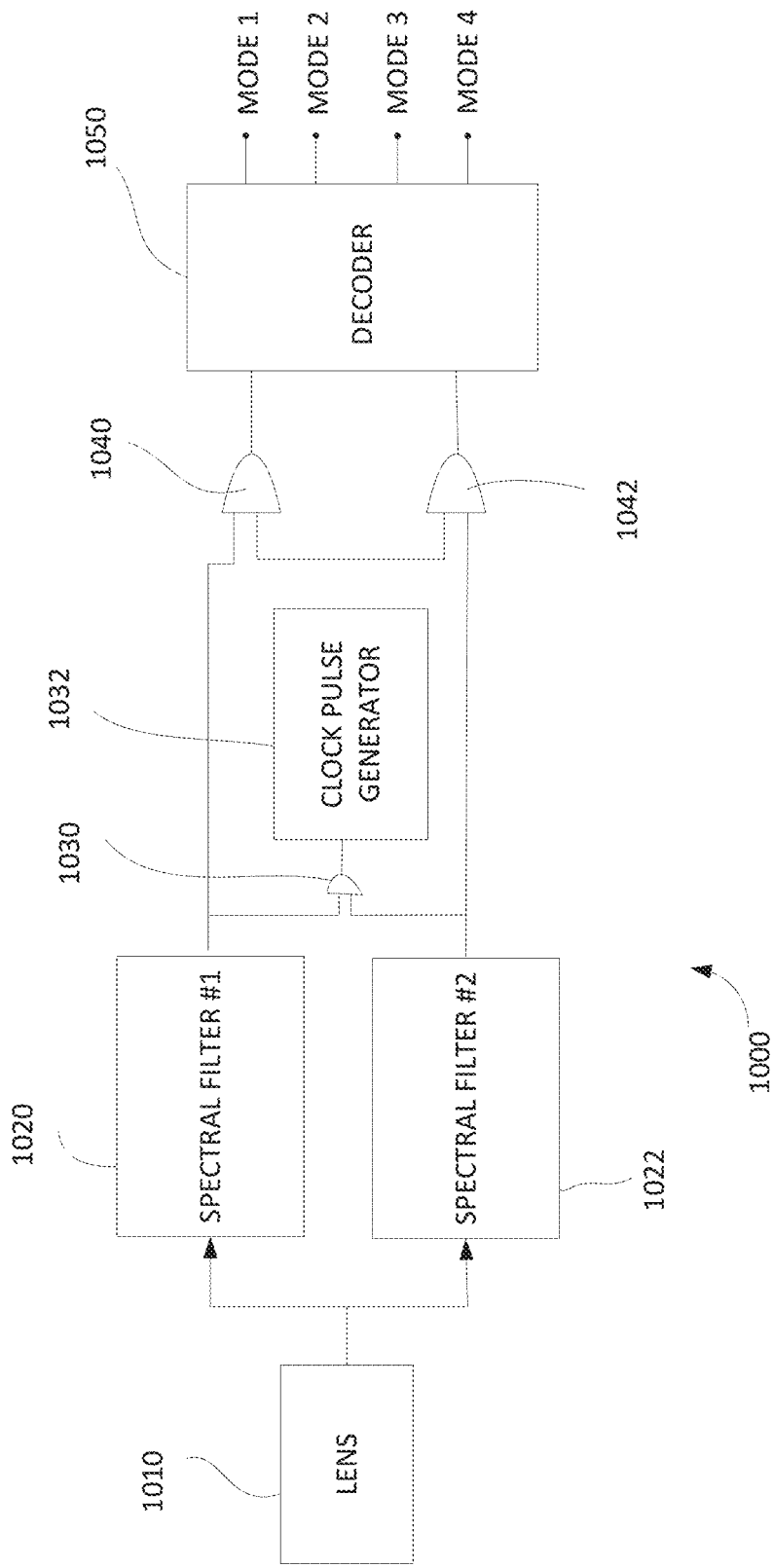
FIG. 10 is a schematic diagram illustrating a circuit and logic used for receiving and decoding signals from the platoon annunciator device of FIGS. 5a-5c in accordance with a further example embodiment.

FIG. 10 is a schematic diagram illustrating a circuit and logic system 1000 used for receiving and decoding signals from the platoon annunciator device 246 of FIGS. 5*a*-5*c* in accordance with a further example embodiment. The circuit and logic system 1000 for receiving and decoding signals from the platoon annunciator device 246 in accordance with the example embodiment includes a lens 1010 configured to receive the visual signals 410, 420, 430, 440 (FIG. 4) from the platoon annunciator device 246.

The lens 1010 may have properties for adapting it to capture the signals in bad weather conditions, and the like. The lens may be a Fresnel lens or similar. Since the visual signals are in the example embodiment green and yellow signals using green and yellow light, the circuit and logic system 1000 further includes a first spectral filter 1020 for filtering green light and a second spectral filter 1022 for filtering yellow light. In the example embodiment, if both green and yellow light signals are received, an AND gate 1030 activates a clock pulse generator 1032, which in turn sets an AND gate pair 1040, 1042 to a state ready to receive and pass through the results of the filtering from the first and second spectral filters 1020, 1022. A decoder 1050 is provided for decoding the results of the first and second spectral filters 1020, 1022 into the platooning modes MODE_1-MODE_4.

Figure 11:
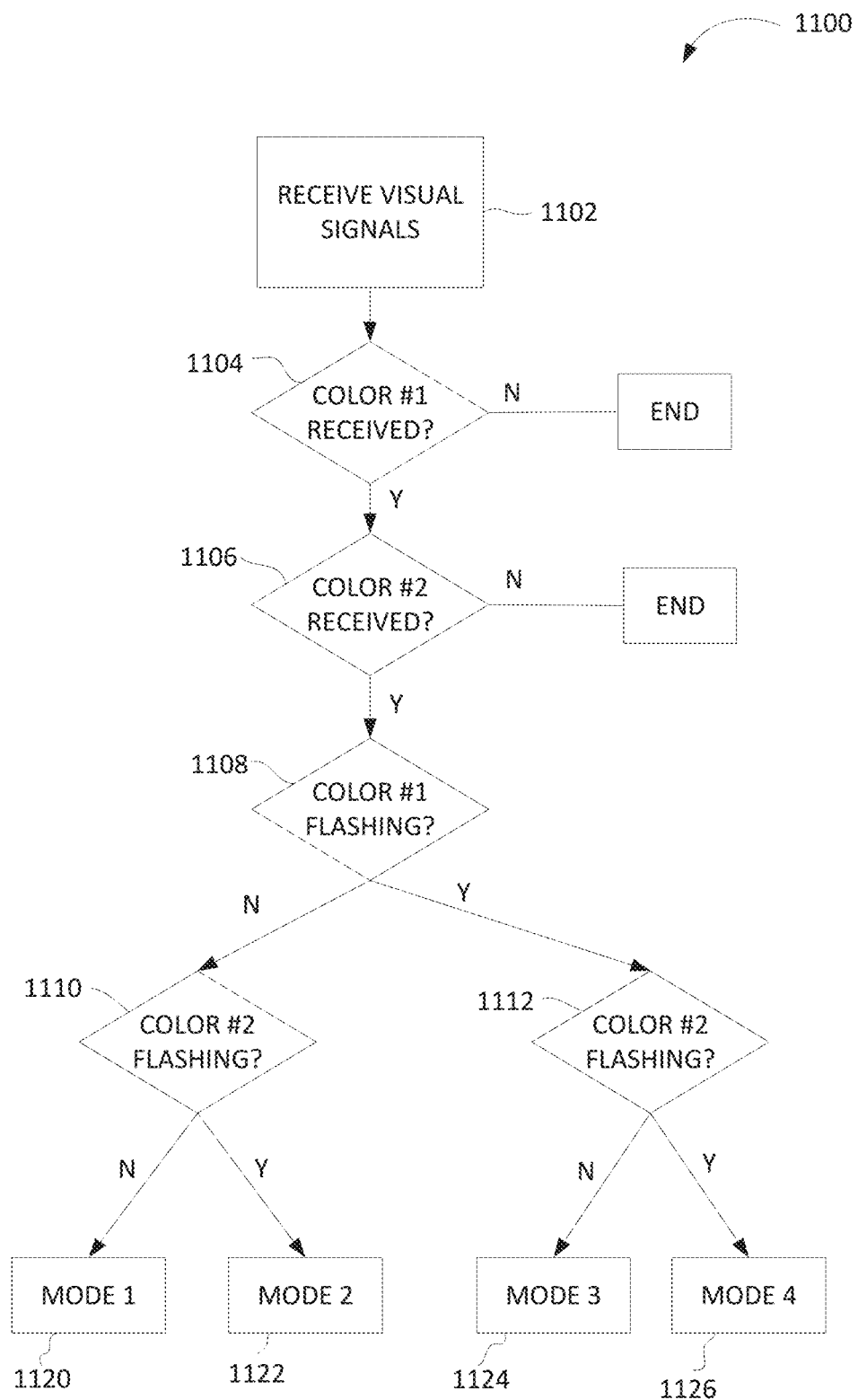
FIG. 11 is a flow diagram showing a method of operating the circuit and logic of FIG. 10 to receive and decode the signals from the platoon annunciator device of FIGS. 5a-5c in accordance with a further example embodiment.

FIG. 11 is a flow diagram showing a method 1100 of operating the circuit and logic system 1000 of FIG. 10 to receive and decode the signals from the platoon annunciator device of FIGS. 5*a*-5*c* in accordance with a further example embodiment. The visual signals 410, 420, 430, 440 (FIG. 4) are received at step 1102 from the platoon annunciator device 246. In step 1104 it is determined whether the visual signals have the first color, and in step 1106 it is determined whether the visual signals have the second color.

In step 1108, since both the first and second visual colors are received simultaneously, the dual authentication is met. Accordingly, at step 1108 it is determined whether the first visual signal is flashing. If the first visual signal is not flashing it is determined in step 1110 whether the second visual signal is flashing. If neither of the first or second visual signals are flashing it is determined in step 1120 that the platoon is in Mode 1 of operation (FIG. 6). However, if it is determined in step 1110 that the second visual signal is flashing but that the first visual signal is not flashing, it is determined in step 1122 that the platoon is in Mode 2 of operation (FIG. 6).

As mentioned, at step 1108 it is determined whether the first visual signal is flashing. If the first visual signal is flashing it is determined in step 1112 whether the second visual signal is flashing. If first visual signal is flashing and the second visual signal is not flashing it is determined in step 1124 that the platoon is in Mode 3 of operation (FIG. 6). However, if it is determined in step 1112 that both of the first and second visual signals are flashing it is determined in step 1126 that the platoon is in Mode 4 of operation (FIG. 6).

It is to be understood that other embodiments will be utilized and structural and functional changes will be made without departing from the scope of the present invention. The foregoing descriptions of embodiments of the present invention have been presented for the purposes of illustration and description. It is not intended to be exhaustive or to limit the invention to the precise forms disclosed. Accordingly, many modifications and variations are possible in light of the above teachings. It is therefore intended that the scope of the invention be limited not by this detailed description.

The invention claimed is:

1. An annunciator system displaying an encoded annunciation of an operational mode of a platoon operation being performed between associated first and second platooning vehicles travelling cooperatively as a platoon in accordance with the operational mode of the platoon operation, the system comprising:
   an annunciator control unit configured to be disposed in the associated first vehicle, the annunciator control unit comprising:
   a processor;
   a non-transient memory device operatively coupled with the processor; and
   logic stored in the non-transient memory device, the logic being executable by the processor to determine the operational mode of the platoon operation being performed between the associated first and second platooning vehicles, and to generate first and second indicator command signals, each of the first and second indicator command signals having respective conditions that in combination encode an annunciation of the determined operational mode of the platoon operation;

a first indicator coupled with the annunciator control unit, the first indicator being responsive to the first indicator command signal received from the annunciator control unit to generate a first light signal in accordance with the condition of the first indicator command signal, the first light signal having a first color; and a second indicator coupled with the annunciator control unit, the second indicator being responsive to the second indicator command signal received from the annunciator control unit to generate a second light signal in accordance with the condition of the second indicator command signal, the second light signal having a second color different than the first color, wherein an encoded annunciation of the determined operational mode of the platoon operation is provided by the first and second indicators generating the first and second light signals in accordance with the conditions of the first and second indicator command signals.

2. The annunciator system according to claim 1, wherein:

the annunciator control unit operates to generate the first and second indicator command signals having ON conditions simultaneously during a first time period based on a determined first operational mode of the platoon operation being performed between the associated first and second platooning vehicles;

the first indicator is responsive to the ON condition of the first indicator command signal to generate the first light signal having the first color during the first time period; and the second indicator is responsive to the ON condition of the second indicator command signal to generate the second light signal having the second color during the first time period, wherein the first and second indicators generating the first and second light signals having the first and second colors responsive to the ON conditions of the first and second indicator command signals during the first time period provides an encoded annunciation of the determined first operational mode of the platoon operation.

3. The annunciator system according to claim 2, wherein:

the annunciator control unit operates to generate, based on a determined second operational mode of the platoon operation, the first indicator command signal having the ON condition during a second time period after the first time period;

the first indicator is responsive to the ON condition of the first indicator command signal to generate the first light signal having the first color during the second time period;

the annunciator control unit operates to generate, based on the determined second operational mode of the platoon operation, the second indicator command signal having a PULSE condition during the second time period; and the second indicator is responsive to the PULSE condition of the second indicator command signal to periodically generate the second light signal having the second color during the second time period, wherein the first indicator generating the first light signal having the first color responsive to the ON condition of the first indicator command signal during the second time period, and the second indicator periodically generating the second light signal having the second color responsive to the PULSE condition of the second indicator command signal during the second time period, provides an encoded annunciation of the determined second operational mode of the platoon operation during the second time period.

4. The annunciator system according to claim 2, wherein:

the annunciator control unit operates to generate, based on a determined third operational mode of the platoon operation, the first and second indicator command signals having PULSE conditions during a second time period after the first time period;

the first indicator is responsive to the PULSE condition of the first indicator command signal to periodically generate the first light signal having the first color during the second time period; and the second indicator is responsive to the PULSE condition of the second indicator command signal to periodically generate the second light signal having the second color during the second time period, wherein the first indicator periodically generating the first light signal having the first color responsive to the PULSE condition of the first indicator command signal during the second time period, and the second indicator periodically generating the second light signal having the second color responsive to the PULSE condition of the second indicator command signal during the second time period, provides an encoded annunciation of the determined third operational mode of the platoon operation during the second time period.

5. The annunciator system according to claim 2, wherein:

the annunciator control unit operates to generate, based on the determined first operational mode of the platoon operation, the first indicator command signal having the ON condition during a second time period after the first time period;

the first indicator is responsive to the ON condition of the first indicator command signal to generate the first light signal having the first color during the second time period;

the annunciator control unit operates to generate, based on the first determined mode of the platoon operation, the second indicator command signal having the ON condition during the second time period; and the second indicator is responsive to the ON condition of the second indicator command signal to generate the second light signal having the second color during the second time period, wherein the first indicator generating the first light signal having the first color responsive to the ON condition of the first indicator command signal during the second time period, and the second indicator generating the second light signal having the second color responsive to the ON condition of the second indicator command signal during the second time period, provides an encoded annunciation of the determined first operational mode of the platoon operation during the second time period.

6. The annunciator system according to claim 2, wherein:

the annunciator control unit operates to generate, based on a determined fourth operational mode of the platoon operation, the first indicator command signal having a PULSE condition during a second time period after the first time period;

the first indicator is responsive to the PULSE condition of the first indicator command signal to periodically generate the first light signal having the first color during the second time period;

the annunciator control unit operates to generate, based on the determined fourth operational mode of the platoon operation, the second indicator command signal having the ON condition during the second time period; and the second indicator is responsive to the ON condition of the second indicator command signal to generate the second light signal having the second color during the second time period, wherein the first indicator periodically generating the first light signal having the first color responsive to the PULSE condition of the first indicator command signal during the second time period, and the second indicator generating the second signal having the second color responsive to the ON condition of the second indicator command signal during the second time period, provides an encoded annunciation of the determined fourth operational mode of the platoon operation during the second time period.

7. The annunciator system according to claim 1, wherein:
the first indicator is operable to generate a green visible light signal; and
the second indicator is operable to generate a yellow visible light signal.

8. The annunciator system according to claim 1, wherein: the annunciator control unit operates to generate:
the first and second indicator command signals simultaneously for a first time period; and
based on the determined operational mode of the platoon operation, only a single one of the first and second indicator command signals or neither of the first and second indicator command signals for a second time period after the first time period.

9. A method for displaying an encoded annunciation of an operational mode of a platoon operation being performed between associated first and second platooning vehicles travelling cooperatively as a platoon in accordance with the operational mode of the platoon operation, the method comprising:
executing logic stored in a non-transient memory of an associated annunciator device to determine the operational mode of the platoon operation being performed between the associated first and second platooning vehicles;
generating by the logic first and second indicator command signals having respective conditions that in combination encode an annunciation of the determined operational mode of the platoon operation;
responsive to the first indicator command signal received from the annunciator control unit, generating by a first indicator of the associated annunciator device a first light signal in accordance with the condition of the first indicator command signal, the first light signal having a first color; and
responsive to the second indicator command signal received from the annunciator control unit, generating by a second indicator of the associated annunciator device a second light signal in accordance with the condition of the second indicator command signal, the second light signal having a second color different than the first color,
wherein the first and second indicators generating the first and second light signals in accordance with the conditions of the first and second indicator command signals provides an encoded annunciation of the determined operational mode of the platoon operation.

10. The method according to claim 9, wherein:
generating the first and second indicator command signals comprises generating the first and second indicator command signals having ON conditions simultaneously during a first time period based on a determined first operational mode of the platoon operation being performed between the associated first and second platooning vehicles;
generating the first light signal comprises generating the first light signal having the first color during the first time period responsive to the ON condition of the first indicator command signal; and
generating the second light signal comprises generating the second light signal having the second color during the first time period responsive to the ON condition of the second indicator command signal,
wherein the first and second indicators generating the first and second light signals having the first and second colors responsive to the ON conditions of the first and second indicator command signals during the first time period provides an encoded annunciation of the determined first operational mode of the platoon operation.

11. The method according to claim 10, further comprising:
generating the first indicator command signal having the ON condition during a second time period after the first time period based on a determined second operational mode of the platoon operation during the second time period after the first time period;
generating the first light signal having the first color during the second time period responsive to the ON condition of the first indicator command signal;
generating the second indicator command signal having a PULSE condition during the second time period after the first time period based on the determined second operational mode of the platoon operation during the second time period; and
periodically generating the second light signal having the second color during the second time period responsive to the PULSE condition of the second indicator command signal,
wherein the first indicator generating the first light signal having the first color responsive to the ON condition of the first indicator command signal during the second time period, and the second indicator periodically generating the second light signal having the second color responsive to the PULSE condition of the second indicator command signal during the second time period, provides an encoded annunciation of the determined second operational mode of the platoon operation during the second time period.

12. The method according to claim 10, further comprising:
generating the first and second indicator command signals having PULSED conditions during a second time period after the first time period based on a determined third operational mode of the platoon operation during the second time period after the first time period;
periodically generating the first light signal having the first color during the second time period responsive to the PULSE condition of the first indicator command signal; and
periodically generating the second light signal having the second color during the second time period responsive to the PULSE condition of the second indicator command signal,
wherein the first indicator periodically generating the first light signal having the first color responsive to the PULSE condition of the first indicator command signal during the second time period, and the second indicator periodically generating the second light signal having the second color responsive to the PULSE condition of the second indicator command signal during the second time period, provides an encoded annunciation of the determined third operational mode of the platoon operation during the second time period.

13. The method according to claim 10, further comprising:
generating the first indicator command signal having the ON condition during a second time period after the first time period based on the determined first operational mode of the platoon operation during a second time period after the first time period;
generating the first light signal having the first color during the second time period responsive to the ON condition of the first indicator command signal;
generating the second indicator command signal having the ON condition during the second time period after the first time period based on the determined first operational mode of the platoon operation during the second time period after the first time period; and
generating the second light signal having the second color during the second time period responsive to the ON condition of the second indicator command signal,
wherein the first indicator generating the first light signal having the first color responsive to the ON condition of the first indicator command signal during the second time period, and the second indicator generating the second light signal having the second color responsive to the ON condition of the second indicator command signal during the second time period, provides an encoded annunciation of the determined first operational mode of the platoon operation during the second time period.

14. The method according to claim 10, further comprising:
generating the first indicator command signal having a PULSE condition during a second time period after the first time period based on a determined fourth operational mode of the platoon operation during the second time period after the first time period;
periodically generating the first light signal having the first color during the second time period responsive to the PULSE condition of the first indicator command signal;
generating the second indicator command signal having the ON condition during a second time period after the first time period based on the determined fourth operational mode of the platoon operation during the second time period after the first time period; and
generating the second light signal having the second color during the second time period responsive to the ON condition of the second indicator command signal,
wherein the first indicator periodically generating the first light signal having the first color responsive to the PULSE condition of the first indicator command signal during the second time period, and the second indicator generating the second light signal having the second color responsive to the ON condition of the second indicator command signal during the second time period, provides an encoded annunciation of the determined fourth operational mode of the platoon operation during the second time period.

15. The method according to claim 9, wherein:
generating the first light signal comprises selectively generating a green visible light signal; and
generating the second light signal comprises selectively generating a yellow visible light signal.

16. The method according to claim 9, wherein:
generating the first and second indicator command signals based on the determined mode of the platoon operation comprises:
generating the first and second indicator command signals simultaneously for a first time period; and
based on the determined operational mode of the platoon operation, generating only a single one of the first and second indicator command signals or neither of the first and second indicator command signals for a second time period after the first time period.

17. An annunciator system for displaying an encoded annunciation of an operational mode of a platoon operation being performed between associated first and second platooning vehicles travelling cooperatively as a platoon in accordance with the operational mode of the platoon operation, the system comprising:
an annunciator control unit configured to be disposed on the associated first vehicle, the annunciator control unit comprising:
a processor;
a non-transient memory device operatively coupled with the processor; and
logic stored in the non-transient memory device, the logic being executable by the processor to determine the operational mode of the platoon operation being performed between the associated first and second platooning vehicles, and to generate first and second indicator command signals having respective conditions that in combination encode an annunciation of the determined operational mode of the platoon operation being performed;
a first indicator coupled with the annunciator control unit, the first indicator being responsive to the first indicator command signal received from the annunciator control unit to generate a first light signal in accordance with the condition of the first indicator command signal; and
a second indicator coupled with the annunciator control unit, the second indicator being responsive to the second indicator command signal received from the annunciator control unit to generate a second light signal different than the first light signal in accordance with the condition of the second indicator command signal,
wherein the annunciator control unit operates to generate the first and second indicator command signals based on the determined operational mode of the platoon operation being performed between the associated first and second platooning vehicles,
wherein the first and second indicators generating the first and second light signals in accordance with the conditions of the first and second indicator command signals provides an encoded annunciation of the determined operational mode of the platoon operation.

18. The annunciator system according to claim 17, wherein:
the annunciator control unit operates to generate:
the first and second indicator command signals simultaneously for a first time period; and
based on the determined operational mode of the platoon operation, only a single one of the first and second indicator command signals or neither of the first and second indicator command signals for a second time period after the first time period.

19. The annunciator system according to claim 18, wherein:
the first indicator is operable to generate a green visible light signal as the first visible light signal; and
the second indicator is operable to generate a yellow visible light signal as the second visible light signal.

20. The annunciator system according to claim 17, wherein:
the first indicator is responsive to the first indicator command signal received from the annunciator control unit to generate a first visible light signal as the first light signal in accordance with the determined condition of the first indicator command signal; and
the second indicator is responsive to the second indicator command signal received from the annunciator control unit to generate a second visible light signal as the second light signal in accordance with the determined condition of the second indicator command signal.

* * * * *